(12) United States Patent
Adema

(10) Patent No.: US 11,966,057 B2
(45) Date of Patent: Apr. 23, 2024

(54) DISPLAY SYSTEM WITH ADJUSTABLE FIELD OF VIEW

(71) Applicant: GOOGLE LLC, Mountain View, CA (US)

(72) Inventor: Daniel Adema, Kitchener (CA)

(73) Assignee: GOOGLE LLC, Mountain View, CA (US)

( * ) Notice: Subject to any disclaimer, the term of this patent is extended or adjusted under 35 U.S.C. 154(b) by 176 days.

(21) Appl. No.: 17/531,117

(22) Filed: Nov. 19, 2021

(65) Prior Publication Data

US 2022/0163803 A1 May 26, 2022

Related U.S. Application Data

(60) Provisional application No. 63/116,337, filed on Nov. 20, 2020.

(51) Int. Cl.
*G02B 27/01* (2006.01)
*G02B 26/10* (2006.01)
*H04N 9/31* (2006.01)

(52) U.S. Cl.
CPC ....... *G02B 27/0172* (2013.01); *G02B 26/105* (2013.01); *H04N 9/3152* (2013.01); *H04N 9/3161* (2013.01); *G02B 2027/0178* (2013.01)

(58) Field of Classification Search
CPC .. H04N 9/3129; H04N 9/3141; H04N 9/3152; H04N 9/3161; H04N 9/3173; G03B 21/008; G03B 21/28; G03B 21/145; G03B 21/208; G03B 21/2033; G03B 21/2053; G03B 21/2066; G02B 26/10; G02B 26/101; G02B 26/105; G02B 26/108; G02B 26/121; G02B 26/122; G02B 27/0031; G02B 27/0075; G02B 27/01; G02B 27/0101; G02B 27/0172; G02B 27/0081
See application file for complete search history.

(56) References Cited

U.S. PATENT DOCUMENTS

| | | | | |
|---|---|---|---|---|
| 2015/0378164 | A1* | 12/2015 | Bailey | G02B 27/017 359/633 |
| 2019/0107623 | A1* | 4/2019 | Campbell | G01S 17/931 |
| 2019/0155337 | A1* | 5/2019 | Ohkawa | G02B 27/0172 |
| 2019/0198982 | A1* | 6/2019 | Moore | H01Q 1/273 |
| 2019/0353895 | A1* | 11/2019 | Oguri | G02B 26/0816 |
| 2020/0211427 | A1* | 7/2020 | Pappas | G01R 31/2635 |

* cited by examiner

*Primary Examiner* — Sultan Chowdhury

(57) ABSTRACT

Display systems, such as near eye display systems or wearable heads up displays, may include a laser projector having an optical switch assembly disposed an at input to an optical scanner of the laser projector. The optical switch assembly includes at least one optical switch, and a controller selectively modifies the orientation of each optical switch to selectively change an angle at which laser light is directed onto a scan mirror of the optical scanner. Changing this angle shifts the scan region over which the scan mirror scans the laser light and, relatedly, shifts a region of a field of view of the display. In some embodiments, the controller is configured to modify the optical switch orientation(s) to correct non-idealities in the angle of the laser light.

20 Claims, 14 Drawing Sheets

DISPLAY SYSTEM WITH ADJUSTABLE FIELD OF VIEW

CROSS-REFERENCE TO RELATED APPLICATIONS

The present application claims priority to U.S. Provisional Patent Application Ser. No. 63/116,337, entitled "STEERABLE FOV IN SCANNING LASER SYSTEMS BY VARYING INPUT ILLUMINATION ANGLE", and filed on Nov. 20, 2020, the entirety of which is incorporated by reference herein.

BACKGROUND

Some display systems employ a projector, which is an optical device that projects or shines a pattern of light onto another object (e.g., onto a surface of another object, such as onto a projection screen) in order to display an image or video on or via that other object. In projectors employing lasers as light sources (that is, in a "laser projector"), each beam of laser light generated by the laser projector is temporally modulated to provide a pattern of laser light and controllable mirrors, such as digital micromirrors, are typically used to spatially distribute the modulated pattern of laser light over a two-dimensional area of another object. The spatial distribution of the modulated pattern of laser light produces an image at the other object.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
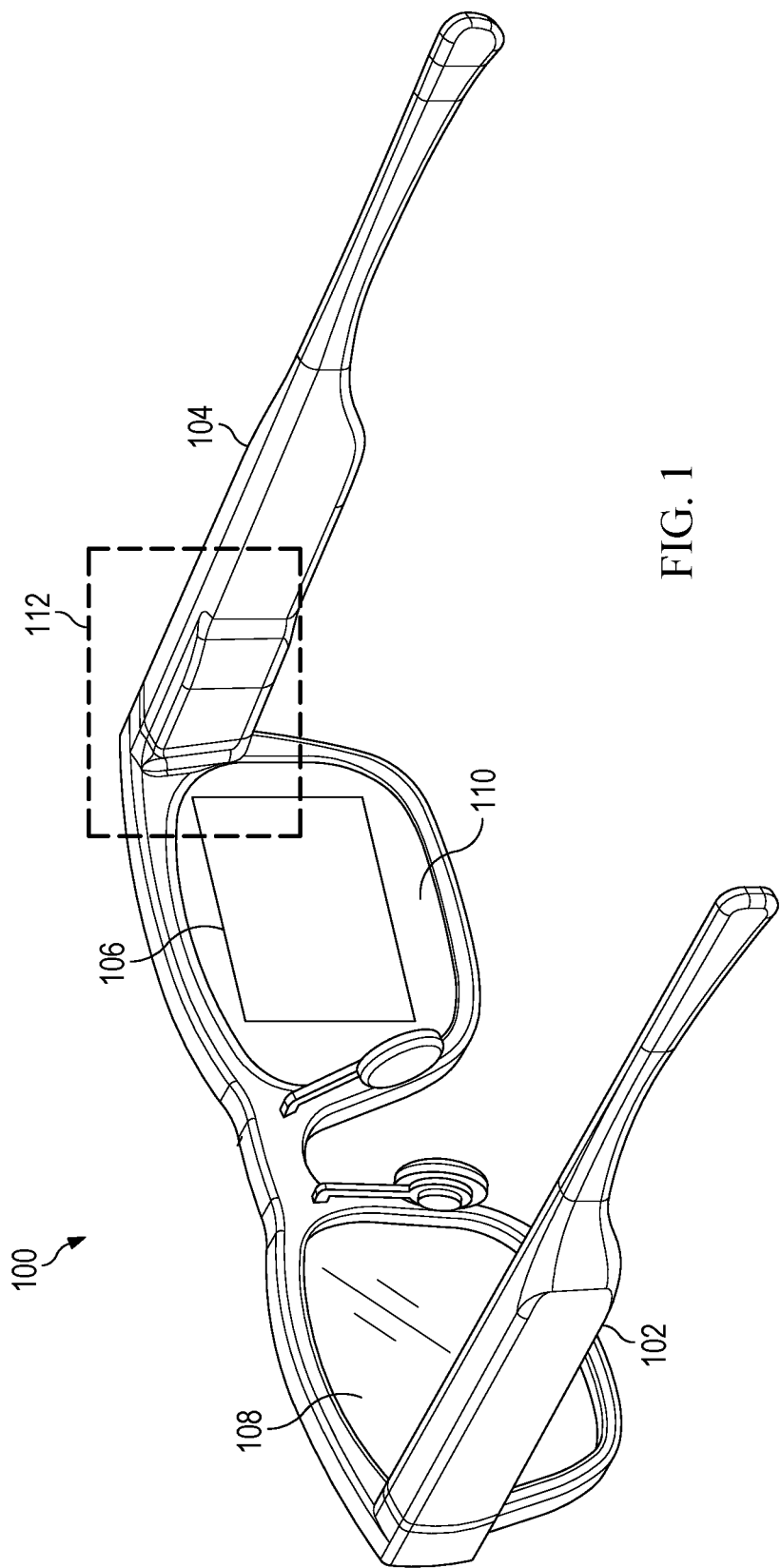
FIG. 1 is a diagram illustrating a display system having an integrated laser projector, in accordance with some embodiments.

FIGS. 1-15 illustrate embodiments for compactly arranging a near-eye display system (e.g., a wearable heads-up display (WHUD)) or another display system. Using the techniques described herein, a laser projector of a display system includes one or more optical switches that are selectively controlled to change the angle at which incoming laser light is incident upon a scan mirror (e.g., a microelectromechanical system (MEMS) mirror). By controlling the angle at which incoming laser light is incident on upon the scan mirror, the display system is able to select a region of a field of view (FOV) of the display system in which images corresponding to the incoming laser light are to be projected (sometimes characterized as "steering" the FOV). By using one or more optical switches to selectively control the angle of incoming laser light received by the scan mirror and to select a region of the FOV for image projection, power and time efficiencies of the laser projector and the display system are improved compared to conventional approaches for FOV region selection.

For example, conventional techniques for limiting image projection to a selected region of a FOV of a display system involve using a scanning laser projector to scan over an area larger than the FOV, while only turning on the light sources for a subset of the scan angles that correspond to the desired region of the FOV. Such conventional approaches are inefficient with respect to both time and power because they require the scanning laser projector to scan over a larger area, even when the image to be displayed is only displayed in a subset of the total achievable FOV of the display system.

In contrast, the optical-switch-based systems and methods described herein do not require the scan angles of the scan mirrors to cover the entire display area, and instead change the region of the FOV in which images are to be projected by changing the orientation(s) of the one or more optical switches, while, in some cases, reducing the scan angle of the scan mirror. This advantageously reduces power consumption and improves scanning speed of the display system, at least for scenarios in which the total achievable FOV of the display system is not used to display an image.

In some embodiments, the optical switch is a mirror that is rotatable about at least one axis. In some embodiments, the laser projector includes one optical switch and two or more stationary reflectors (e.g., fold mirrors). A controller of the laser projector is configured to change the orientation of the optical switch, causing incoming laser light to be directed onto a corresponding stationary reflector. For example, the optical switch directs incoming laser light onto a different stationary reflector at each selectable orientation of the optical switch. Each stationary reflector causes the incoming laser light to be directed onto a scan mirror of the laser projector at an angle associated with that stationary reflector. In some such embodiments, the optical switch is a polarization switch, which a controller causes to either selectively redirect light toward a selected one of the stationary reflectors or allow the light to pass through the polarization switch without being reflected. Changing the angle at which incoming laser light is incident on the scan mirror changes the region of the FOV of the display in which images are projected. Thus, by using the controller to change the orientation of the optical switch, the display system is able to select the region of the FOV onto which images are to be projected for display.

In some embodiments, the laser projector includes first and second optical switches, and a controller of the laser projector is configured to change the orientations of the first and second optical switches, thereby changing the angles at which the optical switches direct incoming laser light onto a scan mirror. In some embodiments, when the controller changes the orientation of the first optical switch, it also changes the orientation of the second optical switch by a corresponding amount, such that reflective surfaces of the first and second optical switches are aligned substantially in parallel with one another. In this way, despite changes to the orientations of the first and second optical switches, the incoming laser light is still directed onto the reflective surface of the scan mirror, though at different angles based on different orientations of the first and second optical switches.

Changing the angle at which incoming laser light is incident on the scan mirror changes the region of the FOV of the display in which images are projected. Thus, by using the controller to change the orientations of the first and second optical switches, the display system is able to select the region of the FOV onto which images are to be projected for display. In some embodiments, the controller is further configured to selectively control the orientations of the first and second optical switches to correct incoming laser light received at the optical switches for instances in which such incoming laser light is aligned at non-ideal or otherwise unexpected angles with respect to the first optical switch. That is, in some embodiments the controller is configured to perform ad-hoc calibration of the angle of incoming laser light by controlling the orientations of the first and second optical switches. In this way, less strict tolerances are required for the optical engine that outputs the incoming laser light received by the first and second optical switches, since angular non-idealities are, in some instances, correctable.

It should be noted that, although some embodiments of the present disclosure are described and illustrated with reference to a particular example near-eye display system in the form of a wearable-heads-up display (WHUD), it will be appreciated that the apparatuses and techniques of the present disclosure are not limited to this particular example, but instead may be implemented in any of a variety of display systems using the guidelines provided herein.

FIG. 1 illustrates an example display system 100 employing a scanning-based optical system in accordance with some embodiments having support structure 102 that includes an arm 104, which houses a laser projector configured to project images toward the eye of a user, such that the user perceives the projected images as being displayed in a field of view (FOV) area 106 of a display at one or both of lens elements 108, 110. In the depicted embodiment, the display system 100 is a near-eye display system in the form of a WHUD in which the support structure 102 is configured to be worn on the head of a user and has a general shape and appearance (that is, form factor) of an eyeglasses (e.g., sunglasses) frame. The support structure 102 contains or otherwise includes various components to facilitate the projection of such images toward the eye of the user, such as a laser projector, an optical scanner, and a waveguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a WiFi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1. It should be understood that instances of the term "or" herein refer to the non-exclusive definition of "or", unless noted otherwise. For example, herein the phrase "X or Y" means "either X, or Y, or both".

One or both of the lens elements 108, 110 are used by the display system 100 to provide an augmented reality (AR) display in which rendered graphical content can be superimposed over or otherwise provided in conjunction with a real-world view as perceived by the user through the lens elements 108, 110. For example, laser light used to form a perceptible image or series of images may be projected by a laser projector of the display system 100 onto the eye of the user via a series of optical elements, such as a waveguide formed at least partially in the corresponding lens element, one or more scan mirrors, and one or more optical relays. One or both of the lens elements 108, 110 thus include at least a portion of a waveguide that routes display light received by an incoupler of the waveguide to an outcoupler of the waveguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the image appears superimposed over at least a portion of the real-world environment.

In some embodiments, the projector is a digital light processing-based projector, a scanning laser projector, or any combination of a modulative light source such as a laser or one or more light-emitting diodes (LEDs) and a dynamic reflector mechanism such as one or more dynamic scanners or digital light processors. In some embodiments, the projector includes multiple laser diodes (e.g., a red laser diode, a green laser diode, and a blue laser diode) and at least one scan mirror (e.g., two one-dimensional scan mirrors, which may be micro-electromechanical system (MEMS)-based or piezo-based). The projector is communicatively coupled to the controller and a non-transitory processor-readable storage medium or memory storing processor-executable instructions and other data that, when executed by the controller, cause the controller to control the operation of the projector. In some embodiments, the controller controls a scan area size and scan area location for the projector and is communicatively coupled to a processor (not shown) that generates content to be displayed at the display system 100. The projector scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the projector routes light via first and second scan mirrors, an optical relay disposed between the first and second scan mirrors, and a waveguide disposed at the output of the second scan mirror. In some embodiments, at least a portion of an outcoupler of the waveguide may overlap the FOV area 106. These aspects are described in greater detail below.

Figure 2:
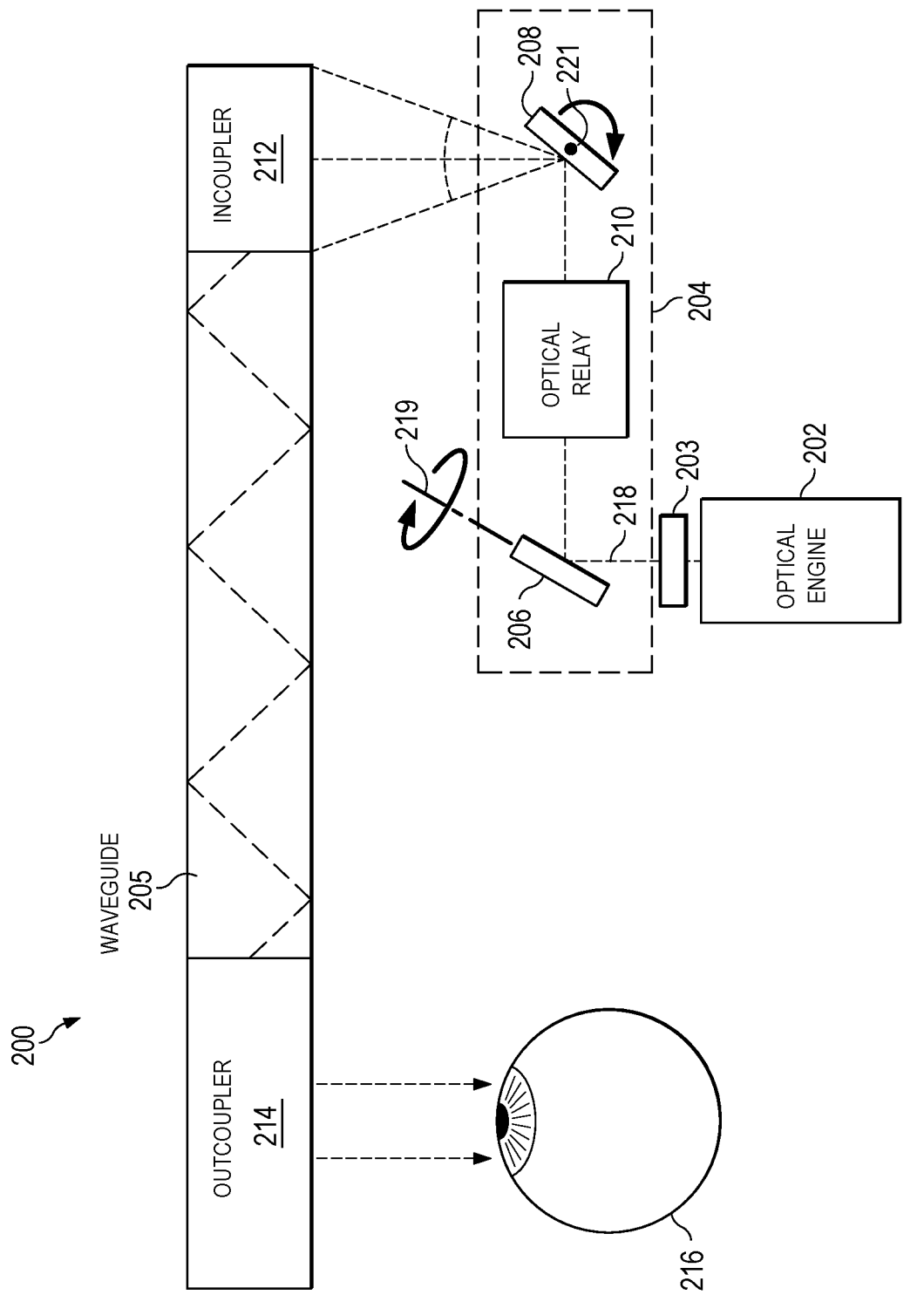
FIG. 2 is a diagram illustrating a laser projector having an optical scanner that includes an optical relay disposed between two scan mirrors, in accordance with some embodiments.

FIG. 2 illustrates a simplified block diagram of a laser projector 200 that projects images directly onto the eye of a user via laser light. The laser projector 200 includes an optical engine 202, an optical switch assembly 203, an optical scanner 204, and a waveguide 205. The optical scanner 204 includes a first scan mirror 206, a second scan mirror 208, and an optical relay 210. The waveguide 205 includes an incoupler 212 and an outcoupler 214, with the outcoupler 214 being optically aligned with an eye 216 of a user in the present example. In some embodiments, the laser projector 200 is implemented in a wearable heads-up display or another display system, such as the display system 100 of FIG. 1.

The optical engine 202 includes one or more laser light sources configured to generate and output laser light 218 (e.g., visible laser light such as red, blue, and green laser light and, in some embodiments, non-visible laser light such as infrared laser light). In some embodiments, the optical engine 202 is coupled to a driver or other controller (not shown), which controls the timing of emission of laser light from the laser light sources of the optical engine 202 in accordance with instructions received by the controller or driver from a computer processor coupled thereto to modulate the laser light 218 to be perceived as images when output to the retina of an eye 216 of a user.

For example, during operation of the laser projector 200, multiple laser light beams having respectively different wavelengths are output by the laser light sources of the optical engine 202, then combined via a beam combiner (not shown), before being directed to the eye 216 of the user. The optical engine 202 modulates the respective intensities of the laser light beams so that the combined laser light reflects a series of pixels of an image, with the particular intensity of each laser light beam at any given point in time contributing to the amount of corresponding color content and brightness in the pixel being represented by the combined laser light at that time.

In some embodiments, the laser light 218 output by the optical engine 202 is reflected by one or more optical switches and, in some instances, reflective surfaces that are included in the optical switch assembly 203. In some embodiments, a controller (not shown) is configured to modify respective orientations of one or more optical switches of the optical switch assembly 203 to change the angle at which the laser light 218 is incident on the first scan mirror 206, which shifts both a scan region of the optical scanner 204 and an associated position of a FOV (e.g., some embodiments of the FOV area 106 of FIG. 1) in which the laser light 218 is projected by the laser projector 200. In some embodiments, the controller is configured to shift the position of the FOV responsive to determining that an image to be displayed in a specified region of the display (i.e., the display that includes the laser projector 200). For example, if a given image is to be displayed in only a lower region of the display, rather than scanning over the entire region of the display in which the laser projector 200 is capable of projecting images, the controller selectively modifies the orientations of one or more optical switches of the optical switch assembly 203 to shift the FOV to the lower region. By selectively controlling the position of the FOV using the optical switch assembly 203 in this way, power efficiency and time efficiency of the laser projector are improved for instances in which images are to be displayed using only a portion of the display that includes the laser projector 200.

One or both of the first and second scan mirrors 206 and 208 of the optical scanner 204 are MEMS mirrors in some embodiments. For example, the first scan mirror 206 and the second scan mirror 208 are MEMS mirrors that are driven by respective actuation voltages to oscillate during active operation of the laser projector 200, causing the first and second scan mirrors 206 and 208 to scan the laser light 218. Oscillation of the first scan mirror 206 causes laser light 218 output by the optical engine 202 to be scanned through the optical relay 210 and across a surface of the second scan mirror 208. The second scan mirror 208 scans the laser light 218 received from the first scan mirror 206 toward an incoupler 212 of the waveguide 205.

In some embodiments, the first scan mirror 206 oscillates or otherwise rotates around a first axis 219, such that the laser light 218 is scanned in only one dimension (i.e., in a line) across the surface of the second scan mirror 208. In some embodiments, the second scan mirror 208 oscillates or otherwise rotates around a second axis 221. In some embodiments, the first axis 219 is skew with respect to the second axis 221.

In some embodiments, the incoupler 212 has a substantially rectangular profile and is configured to receive the laser light 218 and direct the laser light 218 into the waveguide 205. The incoupler 212 is defined by a smaller dimension (i.e., width) and a larger orthogonal dimension (i.e., length). In an embodiment, the optical relay 210 is a line-scan optical relay that receives the laser light 218 scanned in a first dimension by the first scan mirror 206 (e.g., the first dimension corresponding to the small dimension of the incoupler 212), routes the laser light 218 to the second scan mirror 208, and introduces a convergence to the laser light 218 (e.g., via collimation) in the first dimension to an exit pupil plane of the optical relay 210 beyond the second scan mirror 208. Herein, a "pupil plane" refers to a location along the optical path of laser light through an optical system where the laser light converges to an aperture along one or more dimensions. For example, the optical relay 210 may be associated with one or more entrance pupil planes located along the optical path of laser light through the optical system where the laser light converges to a virtual aperture before entering the optical relay 210. For example, the optical relay 210 may be associated with one or more exit pupil planes located along the optical path of laser light through the optical system where the laser light converges to a virtual aperture along one or more dimensions after exiting the optical relay 210. In some embodiments, an entrance pupil plane of the optical relay 210 may be located coincident with the first scan mirror 206. In some embodiments, an entrance pupil plane of the optical relay 210 may be located at an intermediate location between the first scan mirror 206 and the optical relay 210. In some embodiments, an exit pupil plane of the optical relay 210 may be located coincident with the second scan mirror 208. In some embodiments, an exit pupil plane of the optical relay 210 may be located coincident with the incoupler 212.

In some instances, the laser light converges to a virtual aperture of a first entrance pupil plane along a first dimension (e.g., with the laser light converging along the x-y dimension to a point or line along a z dimension with respect to a cartesian coordinate system having x-, y-, and z-axes) and converges to a virtual aperture of a second entrance pupil plane along a second dimension (e.g., the second dimension being substantially perpendicular to the first dimension), where the first and second entrance pupil planes differ with respect to location. In some instances, the laser light converges to a virtual aperture of a first exit pupil plane along a first dimension (e.g., with the laser light converging along the x-y dimension to a point or line along a z dimension with respect to a cartesian coordinate system having x-, y-, and z-axes) and converges to a virtual aperture of an exit entrance pupil plane along a second dimension (e.g., the second dimension being substantially perpendicular to the first dimension), where the first and second exit pupil planes differ with respect to location. In other instances, the laser light converges to a virtual aperture of a single entrance pupil plane along all dimensions (e.g., with the laser light converging to the virtual aperture along each of the x, y, and z dimensions) and converges to a virtual aperture of a single exit pupil plane along all dimensions. While, in the present example, the optical engine 202 is shown to output a single beam of laser light 218 (which itself may be a combination of two or more beams of light having respectively different polarizations or wavelengths) toward the first scan mirror, in some embodiments, the optical engine 202 is configured to generate and output two or more laser light beams toward the first scan mirror, where the two or more laser light beams are angularly separated with respect to one another (i.e., they are "angularly separated laser light beams"). As described previously, two or more laser light beams are "angularly separated" when propagate along respectively different non-parallel and non-perpendicular optical paths that are tilted (e.g., angularly offset) with respect to one another, with the angular separation of the optical paths, in some instances, causing the two or more laser light beams to converge to overlap one another along one or more dimensions (e.g., such overlap corresponding to a virtual aperture of a pupil plane).

In the present example, the possible optical paths of the laser light 218, following reflection by the first scan mirror 206, are initially spread along a first scanning dimension, but later these paths intersect at an exit pupil plane beyond the second scan mirror 208 due to convergence introduced by the optical relay 210. For example, the width (i.e., smallest dimension) of a given exit pupil plane approximately corresponds to the diameter of the laser light corresponding to that exit pupil plane. Accordingly, the exit pupil plane can be considered a "virtual aperture". In some embodiments, the exit pupil plane of the optical relay 210 is coincident with the incoupler 212. In some embodiments, an entrance pupil plane of the optical relay 210 is coincident with the first scan mirror 206.

According to various embodiments, the optical relay 210 includes one or more spherical, aspheric, parabolic, or freeform lenses that shape and relay the laser light 218 on the second scan mirror 208 or includes a molded reflective relay that includes two or more optical surfaces that include, but are not limited to, spherical, aspheric, parabolic, or freeform lenses or reflectors (sometimes referred to as "reflective surfaces" herein), which shape and direct the laser light 218 onto the second scan mirror 208. The second scan mirror 208 receives the laser light 218 and scans the laser light 218 in a second dimension, the second dimension corresponding to the long dimension of the incoupler 212 of the waveguide 205. In some embodiments, the second scan mirror 208 causes the exit pupil plane of the laser light 218 to be swept along a line along the second dimension. In some embodiments, the incoupler 212 is positioned at or near the swept line downstream from the second scan mirror 208 such that the second scan mirror 208 scans the laser light 218 as a line or row over the incoupler 212.

In some embodiments, the optical engine 202 includes an edge-emitting laser (EEL) that emits a laser light 218 having a substantially elliptical, non-circular cross-section, and the optical relay 210 magnifies or minimizes the laser light 218 along one or both of a first direction (e.g., the semi-major axis of the beam profile of the laser light 218) or a second direction (e.g., the semi-minor axis of the beam profile of the laser light 218) to reshape (e.g., circularize) the laser light 218 prior to the convergence of the laser light 218 on the second scan mirror 208. In some such embodiments, a surface of a mirror plate of the first scan mirror 206 is elliptical and non-circular (e.g., similar in shape and size to the cross-sectional area of the laser light 218). In other such embodiments, the surface of the mirror plate of the first scan mirror 206 is circular.

The waveguide 205 of the laser projector 200 includes the incoupler 212 and the outcoupler 214. The term "waveguide," as used herein, will be understood to mean a combiner using one or more of total internal reflection (TIR), specialized filters, or reflective surfaces, to transfer light from an incoupler (such as the incoupler 212) to an outcoupler (such as the outcoupler 214). In some display applications, the light is a collimated image, and the waveguide transfers and replicates the collimated image to the eye. In general, the terms "incoupler" and "outcoupler" will be understood to refer to any type of optical grating structure, including, but not limited to, diffraction gratings, holograms, holographic optical elements (e.g., optical elements using one or more holograms), volume diffraction gratings, volume holograms, surface relief diffraction gratings, or surface relief holograms. In some embodiments, a given incoupler or outcoupler is configured as a transmissive grating (e.g., a transmissive diffraction grating or a transmissive holographic grating) that causes the incoupler or outcoupler to transmit light and to apply designed optical function(s) to the light during the transmission. In some embodiments, a given incoupler or outcoupler is a reflective grating (e.g., a reflective diffraction grating or a reflective holographic grating) that causes the incoupler or outcoupler to reflect light and to apply designed optical function(s) to the light during the reflection. In the present example, the laser light 218 received at the incoupler 212 is relayed to the outcoupler 214 via the waveguide 205 using TIR. The laser light 218 is then output to the eye 216 of a user via the outcoupler 214. As described above, in some embodiments the waveguide 205 is implemented as part of an eyeglass lens, such as the lens 108 or lens 110 (FIG. 1) of the display system having an eyeglass form factor and employing the laser projector 200.

Although not shown in the example of FIG. 2, in some embodiments additional optical components are included in any of the optical paths between the optical engine 202 and the first scan mirror 206, between the first scan mirror 206 and the optical relay 210, between the optical relay 210 and the second scan mirror 208, between the second scan mirror 208 and the incoupler 212, between the incoupler 212 and the outcoupler 214, or between the outcoupler 214 and the eye 216 (e.g., in order to shape the laser light for viewing by the eye 216 of the user). In some embodiments, a prism is used to steer light from the second scan mirror 208 into the incoupler 212 so that light is coupled into incoupler 212 at the appropriate angle to encourage propagation of the light in waveguide 205 by TIR. Also, in some embodiments, an exit pupil expander (e.g., an exit pupil expander 304 of FIG. 3, described below), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 216 of the user).

Figure 3:
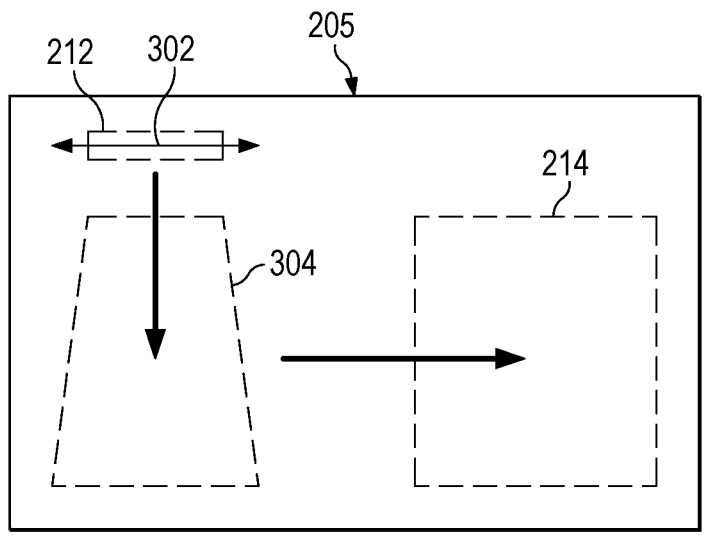
FIG. 3 is a diagram illustrating a waveguide having an incoupler, outcoupler, and exit pupil expander, in accordance with some embodiments.

FIG. 3 shows an example of light propagation within the waveguide 205 of the laser projector 200 of FIG. 2 in accordance with some embodiments. As shown, light received via the incoupler 212, which is scanned along the scanning dimension 302, is directed into an exit pupil expander 304 and is then routed to the outcoupler 214 to be output (e.g., toward the eye of the user). In some embodiments, the exit pupil expander 304 expands one or more dimensions of the eyebox of a display system (e.g., the display system 100 of FIG. 1; the WHUD 600, 702 of FIGS. 6 and 7) that includes the laser projector 200 (e.g., with respect to what the dimensions of the eyebox of the display would be without the exit pupil expander 304). In some embodiments, the incoupler 212 and the exit pupil expander 304 each include respective one-dimensional diffraction gratings (i.e., diffraction gratings that extend along one dimension), which diffract incident light in a particular direction depending on the angle of incidence of the incident light and the structural aspects of the diffraction gratings. It should be understood that FIG. 3 shows a substantially ideal case in which the incoupler 212 directs light straight down (with respect to the presently illustrated view) in a first direction that is perpendicular to the scanning dimension 302, and the exit pupil expander 304 directs light to the right (with respect to the presently illustrated view) in a second direction that is perpendicular to the first direction. While not shown in the present example, it should be understood that, in some embodiments, the first direction in which the incoupler 212 directs light is slightly or substantially diagonal, rather than exactly perpendicular, with respect to the scanning dimension 302.

Figure 4:
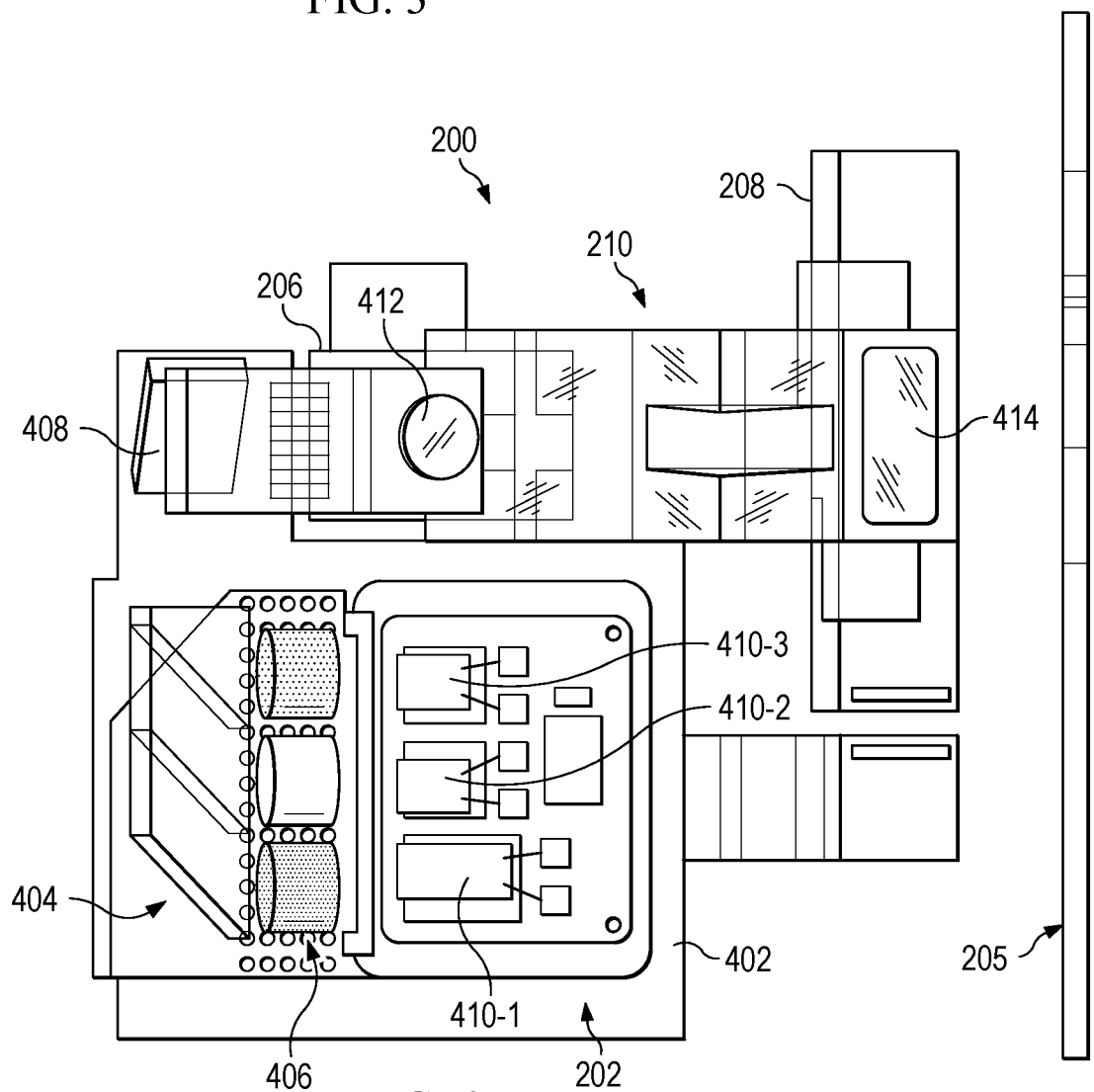
FIG. 4 is a diagram illustrating a laser projector that includes a molded reflective relay disposed between two scan mirrors, in accordance with some embodiments.

FIG. 4 shows an example embodiment of the laser projector 200 in which the optical relay 210 includes a molded reflective relay. As shown, the laser projector 200 includes a substrate 402 on which a beam combiner 404, primary lenses 406, and a mirror 408 are disposed. According to various embodiments, the substrate 402 is a printed circuit board (PCB) or otherwise another applicable substrate.

The optical engine 202 comprises a set of one or more laser light sources 410 (e.g., laser diodes), such as the illustrated red laser light source 410-1, green laser light source 410-2, and blue laser light source 410-3, wherein a processor or other controller operates the optical engine 202 to modulate the respective intensity of each laser light source 410 so as to provide a corresponding red light, green light, and blue light contribution to a corresponding pixel of an image being generated for display to the user. The primary lenses 406 includes a corresponding number of collimation lenses (e.g., three for the three laser light sources 410 in the example above), each interposed in the light path between a respective laser light source 410 of the optical engine 202 and the beam combiner 404. For example, each laser light source 410 outputs a different wavelength of laser light (e.g., corresponding to respective red, blue, and green wavelengths) through the primary lenses 406 to be combined at the beam combiner 404 to produce the laser light (i.e., laser light 218 shown in FIG. 2) to be projected by the laser projector 200. The beam combiner 404 receives the individual laser light inputs and outputs a combined laser light 218 to the mirror 408, which redirects the laser light 218 onto a reflective surface 412 of the first scan mirror 206. The first scan mirror 206 scans the laser light 218 into the optical relay 210 along a first scanning dimension.

In the example of FIG. 4, the optical relay 210 is a molded reflective relay, which may be, for example, molded from a solid clear component (e.g., glass or an optical plastic such as Zeonex) and the reflective surfaces thereof are implemented as mirror coatings or metasurfaces. In some embodiments, one or more reflective surfaces of the molded reflective relay 1802 reflect light via TIR and therefore do not require mirror coatings or fabricated metasurfaces to reflect light. Such molding can simplify the fabrication of the laser projector 200 as it facilitates the incorporation of some or all of the optical surfaces of the relay into a single element, rather than several distinct, separate elements. Further, in some embodiments, the use of a molded structure allows for light to be propagated through one or more regions of the molded reflective relay 1802 via TIR, rather using mirror coatings to propagate light through those regions.

The optical relay 210 is configured to route the laser light 218 toward a reflective surface 414 of the second scan mirror 208. The second scan mirror 208 scans the laser light 218 across the incoupler (such as the incoupler 212) of the waveguide 205 along a second scanning dimension. In some embodiments, the second scanning dimension is perpendicular to the plane along which the laser light propagates through the optical relay 210.

Figure 5:
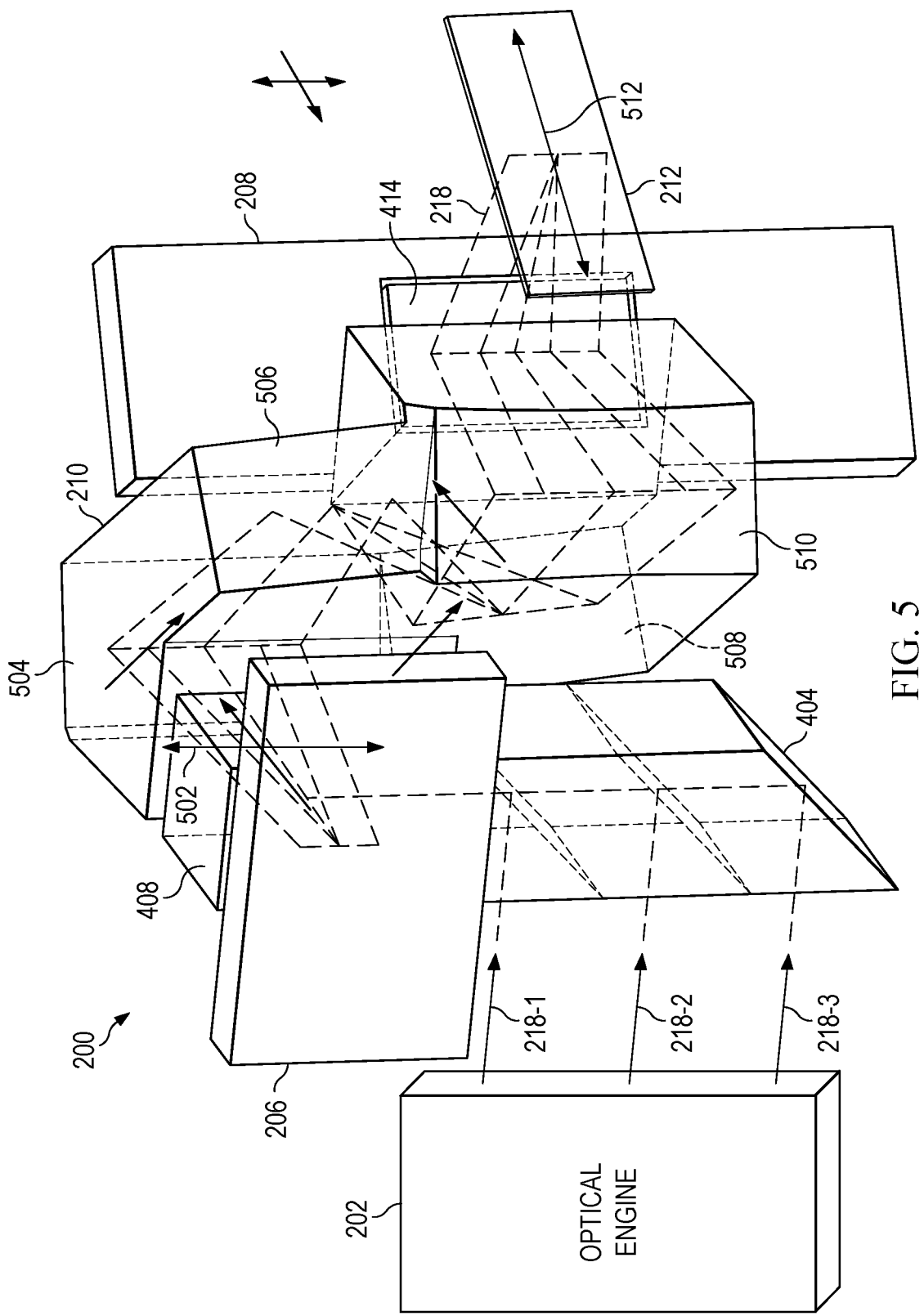
FIG. 5 is a diagram illustrating a laser projector that includes a molded reflective relay disposed between two scan mirrors, and illustrating optical paths through the molded reflective relay, in accordance with some embodiments.

FIG. 5 shows an example of paths that the concurrent laser lights output by the optical engine 202 can take through the optical relay 210 for an embodiment in which the optical relay 210 is a molded reflective relay. As shown, the optical engine 202 outputs red laser light 218-1, green laser light 218-2, and blue laser light 218-3 toward the beam combiner 404. The beam combiner 404 combines individual beams of the laser light 218-1, 218-2, 218-3 into the laser light 218, and redirects the laser light 218 toward the mirror 408, which reflects the laser light 218 onto the first scan mirror 206. The first scan mirror 206 scans the laser light 218 along a first scanning dimension 502 into the optical relay 210. The optical relay 210 reflects the laser light 218 off of reflective surfaces 504, 506, 508, and 510, then outputs the laser light 218 toward the reflective surface 414 of the second scan mirror 208. The second scan mirror 208 then scans the laser light 218 across the incoupler 212 along a second scanning dimension 512, where the laser light 218 converges onto the incoupler 212 at most or all achievable scan angles of the first scan mirror 206. While, in the present example, the beam combiner 404 is shown to output a single beam of the laser light 218, it should be understood that, in some embodiments, the beam combiner 404 is configured to output two or more angularly separated laser light beams, which are directed onto the first scan mirror 206.

Figure 6:
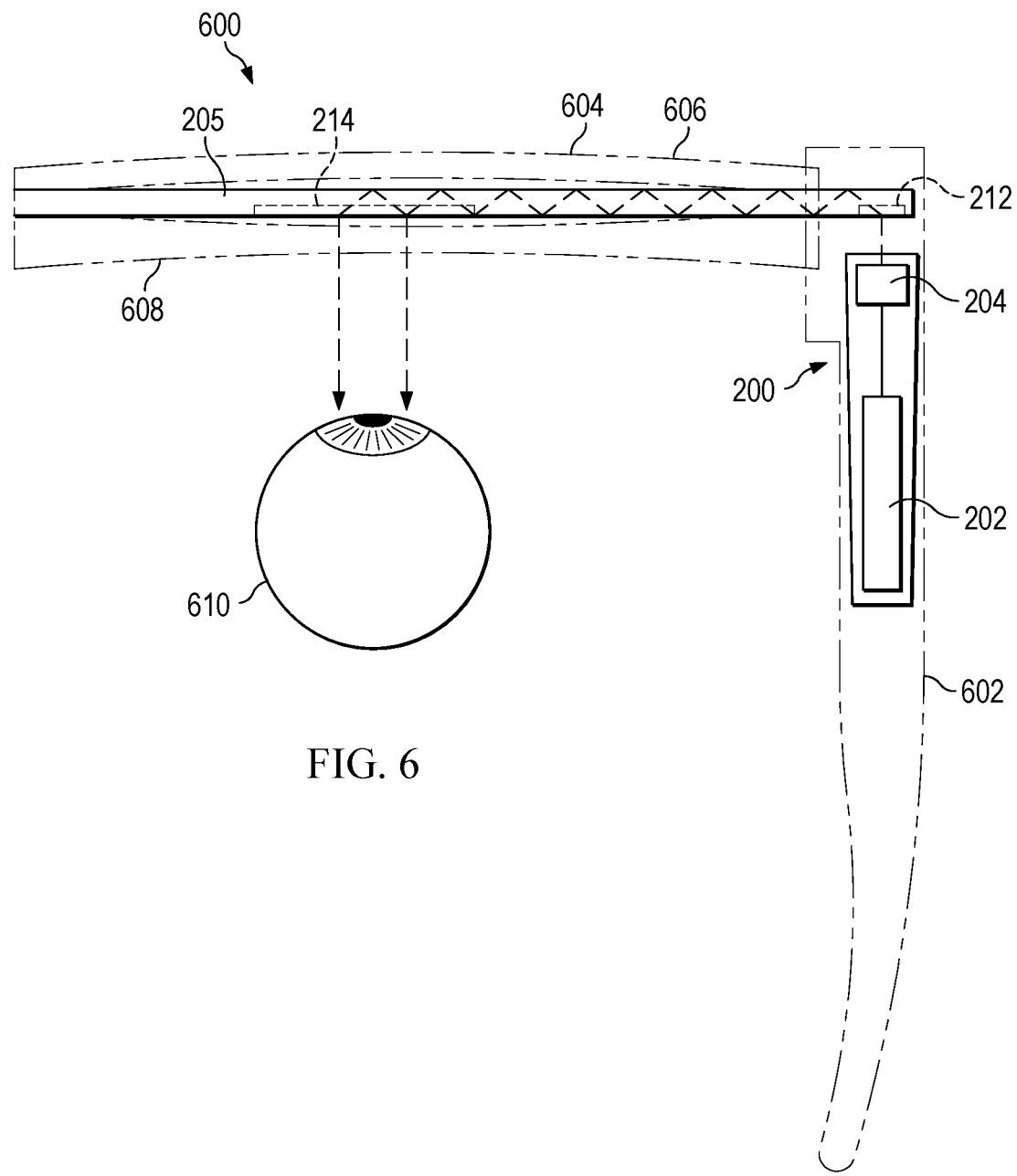
FIG. 6 is a diagram illustrating a partially transparent view of a wearable heads-up display (WHUD) that includes a laser projector, in accordance with some embodiments.

FIG. 6 illustrates a portion of a WHUD 600 that includes the laser projector 200 of FIG. 2. In some embodiments, the WHUD 600 represents the display system 100 of FIG. 1. The optical engine 202, the optical scanner 204, the incoupler 212, and a portion of the waveguide 205 are included in an arm 602 of the WHUD 600, in the present example.

The WHUD 600 includes an optical combiner lens 604, which includes a first lens 606, a second lens 608, and the waveguide 205, with the waveguide 205 disposed between the first lens 606 and the second lens 608. Light exiting through the outcoupler 214 travels through the second lens 608 (which corresponds to, for example, the lens element 110 of the display system 100). In use, the light exiting the second lens 608 enters the pupil of an eye 610 of a user wearing the WHUD 600, causing the user to perceive a displayed image carried by the laser light output by the optical engine 202. The optical combiner lens 604 is substantially transparent, such that light from real-world scenes corresponding to the environment around the WHUD 600 passes through the first lens 606, the second lens 608, and the waveguide 205 to the eye 610 of the user. In this way, images or other graphical content output by the laser projector 200 are combined (e.g., overlayed) with real-world images of the user's environment when projected onto the eye 610 of the user to provide an AR experience to the user.

Although not shown in the depicted example, in some embodiments additional optical elements are included in any of the optical paths between the optical engine 202 and the incoupler 212, in between the incoupler 212 and the outcoupler 214, or in between the outcoupler 214 and the eye 610 of the user (e.g., in order to shape the laser light for viewing by the eye 610 of the user). As an example, a prism is used to steer light from the optical scanner 204 into the incoupler 212 so that light is coupled into incoupler 212 at the appropriate angle to encourage propagation of the light in waveguide 205 by TIR. Also, in some embodiments, an exit pupil expander (e.g., the exit pupil expander 304), such as a fold grating, is arranged in an intermediate stage between incoupler 212 and outcoupler 214 to receive light that is coupled into waveguide 205 by the incoupler 212, expand the light, and redirect the light towards the outcoupler 214, where the outcoupler 214 then couples the laser light out of waveguide 205 (e.g., toward the eye 610 of the user).

Figure 7:
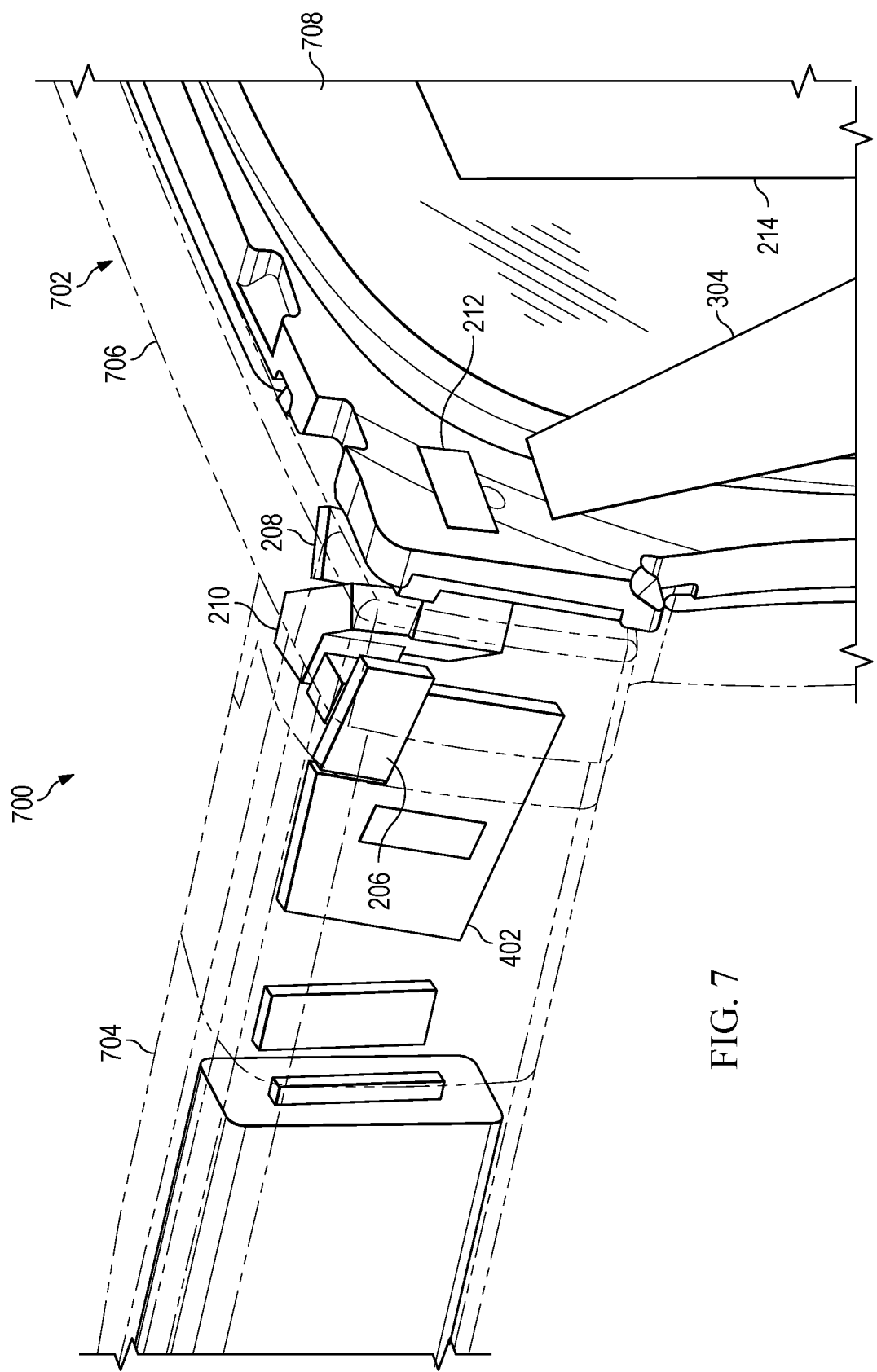
FIG. 7 is a diagram illustrating a partially transparent front isometric view of a laser projector disposed within a WHUD, in accordance with some embodiments.
Figure 8:
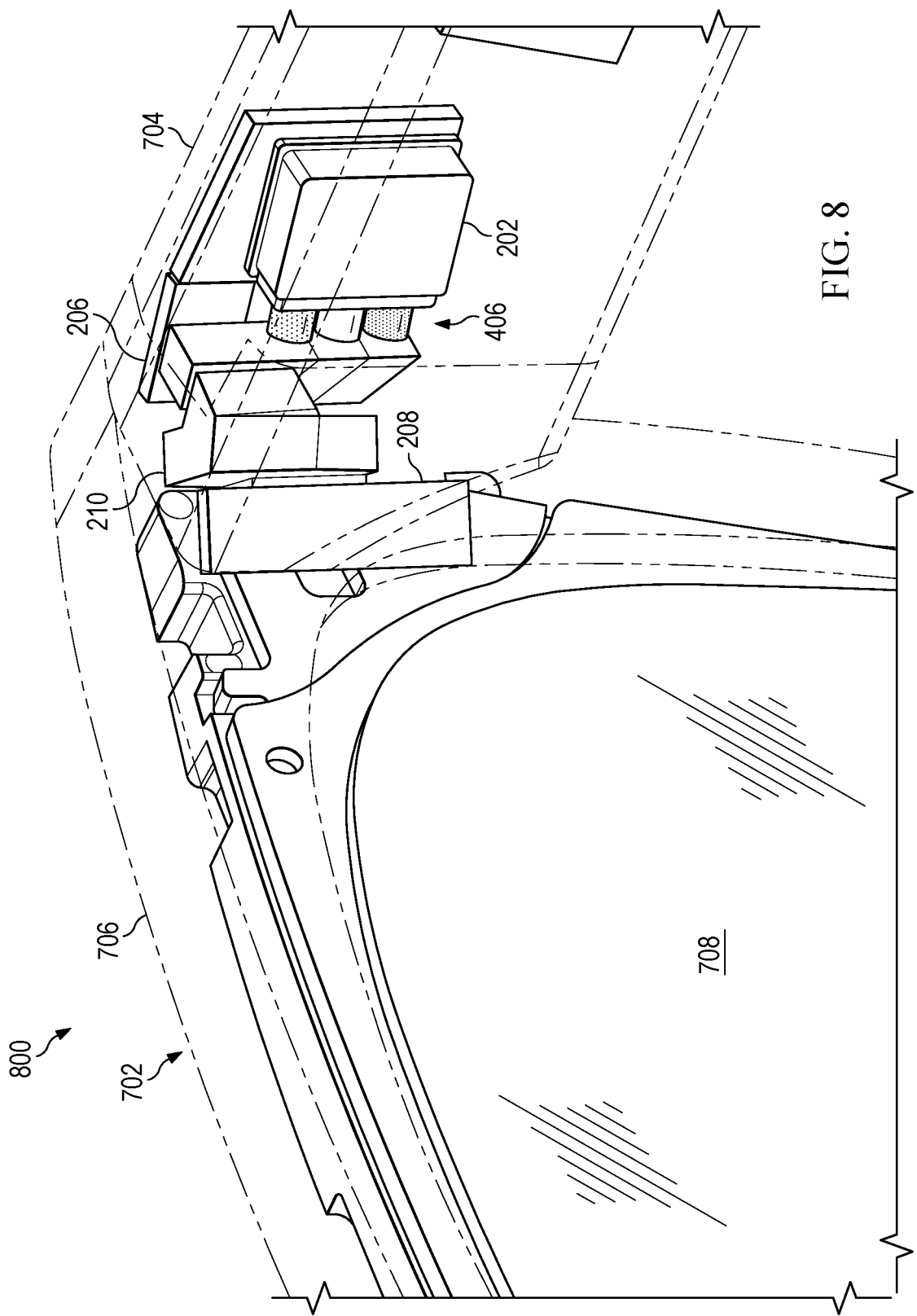
FIG. 8 is a diagram illustrating a partially transparent rear isometric view of a laser projector disposed within a WHUD, in accordance with some embodiments.

FIGS. 7 and 8 show two different perspectives of partially transparent views 700 (FIGS. 7) and 800 (FIG. 8) of a portion of a WHUD 702, which represents the WHUD 600 of FIG. 6 or the display system 100 of FIG. 1. The WHUD 702 includes an example arrangement of the laser projector 200 of FIGS. 2, 4, and 5 for an embodiment in which the optical relay 210 is a molded reflective relay. In some embodiments, the WHUD 702 corresponds to the display system 100 of FIG. 1, and the illustrated portion of the WHUD 702 corresponds to the region 112 of the display system 100.

As shown by the views 700 of FIGS. 7 and 800 of FIG. 8, the arm 704 of the WHUD 702 houses the optical engine 202, the primary lenses 406 and at least a portion of the first scan mirror 206, the optical relay 210, and the substrate 402. A frame section 706 of the WHUD 702 houses the second scan mirror 208 and portions of the first scan mirror 206, the optical relay 210, and the substrate 402. As shown by the view 700 of FIG. 7, the incoupler 212 and the outcoupler 214 of the waveguide 205 (not fully shown in the views of FIGS. 7 and 8), are each embedded in or otherwise disposed on the lens 708 (one embodiment of, for example, lens 110 of FIG. 1). As described previously, laser light output by the optical engine 202 (e.g., laser light 218, FIG. 5) is routed to the incoupler 212 via at least the first scan mirror 206, the optical relay 210, and the second scan mirror 208. The first scan mirror 206 oscillates or otherwise rotates to scan the laser light along a first scanning dimension, and the second scan mirror 208 oscillates or otherwise rotates to scan the laser light along a second scanning dimension that is perpendicular to the first scanning dimension. Laser light reflected by the second scan mirror 208 converges to a line at the incoupler 212. Relayed laser light received at the incoupler 212 is routed to the outcoupler 214 via the waveguide 205. The laser light received at the outcoupler 214 is then directed out of the waveguide 205 (e.g., toward the eye of a user of the WHUD 702).

Figure 9:
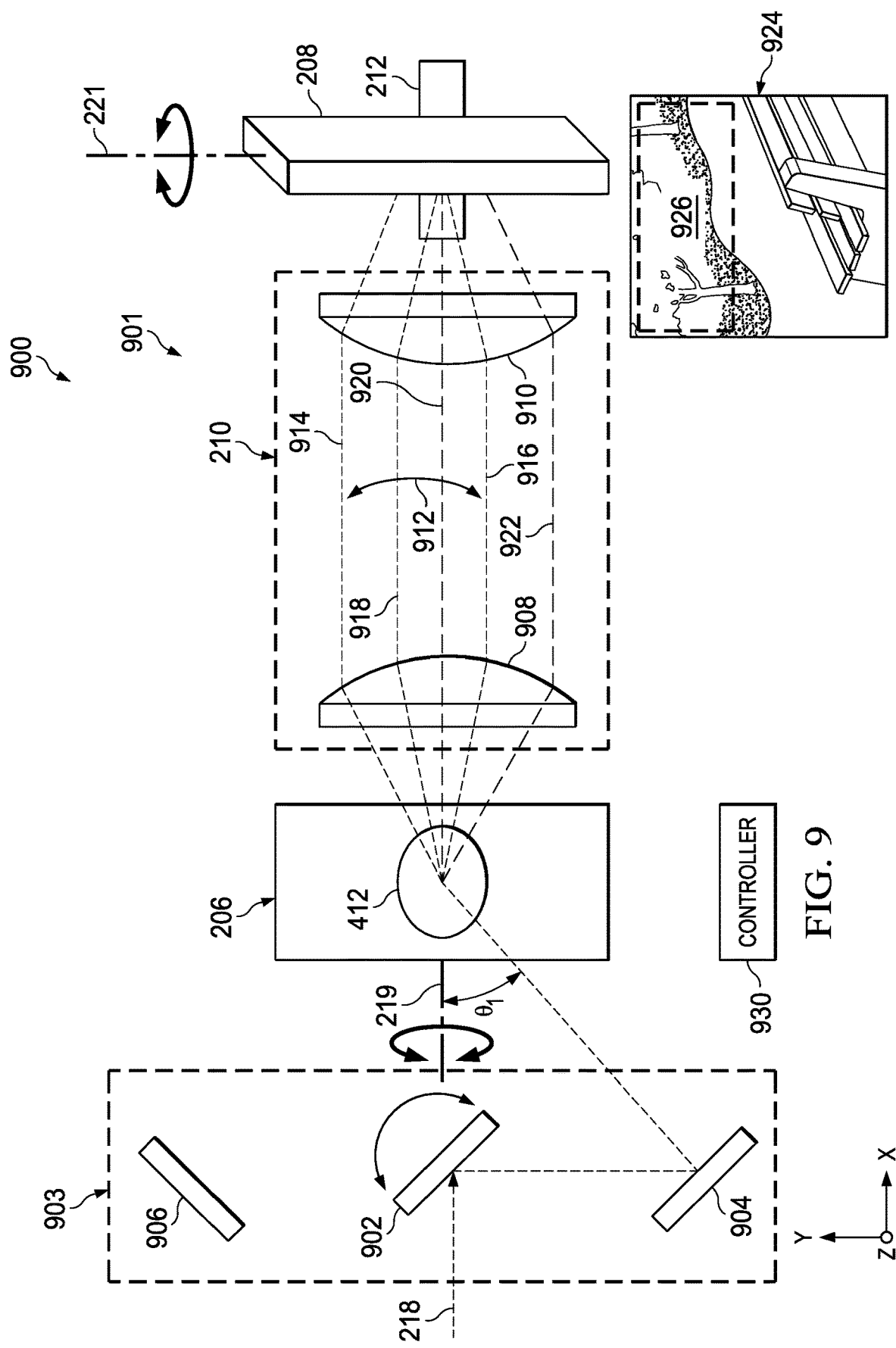
FIG. 9 is a diagram illustrating an isometric view of a portion of a laser projector in which an optical switch is oriented in a first position that causes a corresponding image to be projected to a field of view (FOV) in a lower region of the display, in accordance with some embodiments.

FIG. 9 shows an illustrative isometric view 900 depicting an optical scanner 901 (one embodiment of the optical scanner 204 of the laser projector 200 of FIG. 2), where an optical switch assembly 903 (one embodiment of the optical switch assembly 203 of FIG. 2), including an optical switch 902, a first reflector 904, and a second reflector 906, is disposed in the optical path of the laser light 218. The optical switch 902 selectively redirects the laser light 218 toward either the first reflector 904 or the second reflector 906, for example, thereby controlling an angle of incidence of the laser light 218 on a reflective surface 412 of a first scan mirror 206 of the optical scanner 901. In some embodiments, the optical switch 902 is a rotatable mirror or other element capable of selectively redirecting light. In the present example, the optical switch 902 is selectively switchable (e.g., rotatable) between at least two orientations. The present example shows a first orientation in which the optical switch 902 redirects the laser light 218 toward the first reflector 904. In some embodiments, a controller 930 selectively controls the orientation of the optical switch 902. The orientation of the optical switch 902 controls the position of a scan region of the optical scanner 901, which shifts the location of a FOV of the display system that includes the optical scanner 901. Herein the "scan region" of an optical scanner, such as the optical scanner 901, refers to the region of space over which incoming light, such as the laser light 218, is scanned by a first scan mirror, such as the first scan mirror 206, prior to incidence of the laser light 218 on a second scan mirror, such as the second scan mirror 208, or an incoupler, such as the incoupler 212. In the present example, the isometric view 900 of the optical scanner 901 is provided with respect to a three-dimensional cartesian coordinate system having respectively orthogonal x-, y-, and z-axes, where the isometric view 900 provides the perspective of looking down the positive z-axis. It should be noted that the present example and the following examples correspond to embodiments in which the image to be displayed is not inverted. For embodiments in which the image to be displayed is inverted, the direction in which the scan region is offset is instead opposite the direction in which the FOV area is to be shifted (e.g. the optical switch 902 instead causes the scan region to be offset "up" to cause the FOV area to shift "down" in the display area, and vice versa).

The laser light 218, upon being reflected by the first reflector 904, is incident upon the reflective surface 412 of the scan mirror 206 at a first angle $\theta_1$, which causes the scan mirror 206 to scan the laser light 218 into the optical relay 210 over an offset scan region 912 that is offset with respect to a centered scan region. For example, the first angle $\theta_1$ is neither parallel nor perpendicular to the semi-major axis of the ellipse of the reflective surface 412, with respect to the x- and y-dimensions. For example, the first angle $\theta_1$ is neither parallel nor perpendicular to the axis 219, with respect to the x- and y-dimensions. The centered second scan region is the region over which laser light 218 would be scanned over if the laser light 218 were incident upon the reflective surface 412 (at or near the center of the reflective surface 412) at an angle substantially perpendicular to the semi-minor axis of the reflective surface 412 with respect to the x- and y-dimensions.

Herein, two lines or axes are considered "substantially perpendicular" to one another with respect to two dimensions if they are within about 5 degrees of being perpendicular to one another in the two dimensions. Further, two lines or axes are considered "substantially parallel" to one another with respect to two dimensions if they are within about 5 degrees of being parallel to one another in the two dimensions.

The centered scan region extends from about an upper boundary 914, sometimes referred to as a "centered upper boundary" to a lower boundary 922, sometimes referred to as a "centered lower boundary". In the present example, the reflective surface 412 is an elliptical surface with a major axis extending along the x-dimension and a semi-minor axis extending along the y-dimension. However, it should be understood that shape of the reflective surface 412 is not limited to an ellipse, and according to various other embodiments is a rectangle, circle, or other applicable shape.

The offset scan region 912, in contrast to the centered scan region, extends from the upper boundary 914 to an offset lower boundary 916 that is located between the centered lower boundary 922 and a central ray 920 of the centered scan region. A central ray 918 of the offset scan region 912 is disposed between the upper boundary 914 and the offset lower boundary 916. Here, the "central ray" of a given scan region corresponds to a ray extending through a center of the scan region and corresponds to the path along which the laser light 218 is reflected by the reflective surface 412 when the reflective surface 412 is at the center of its oscillation (e.g., the mid-point between the two boundary positions between which the reflective surface 412 of the first scan mirror 206 oscillates). As shown, the locations of the central ray and one or both of the upper and lower boundaries of the scan region change as the angle at which the laser light 218 is incident upon the reflective surface 412 changes. The laser light 218 is reflected by the reflective surface 412 of the first scan mirror 206 through the optical relay 210 and onto the reflective surface of the second scan mirror 208. In some embodiments, the optical relay 210 includes lenses 908 and 910. The lens 908 collimates the laser light 218 received from the first scan mirror 206, and the lens 910 focuses the laser light 218 onto the reflective surface of the second scan mirror 208, which then rotates about the axis 221 to scan the laser light 218 across the incoupler 212. In other embodiments, the optical relay 210 is instead a molded reflective relay that includes two or more optical surfaces that include, but are not limited to, spherical, aspheric, parabolic, or freeform lenses or reflectors.

By using the optical switch 902 and the first reflector 904 to direct the laser light 218 onto the reflective surface 412 at the first angle $\theta_1$, the scan region of the optical scanner 901 is shifted, with the amount of the shift corresponding to the magnitude of angular separation between the angle $\theta_1$ and either the semi-major axis of the reflective surface 412 or the axis 219 with respect to the x- and y-dimensions (the magnitude is the same using either axis as a reference point in the present example). Additionally, the direction of the shift (toward the upper boundary 914 or the lower boundary 922) of the scan region corresponds to whether the angle $\theta_1$ is angularly separated from the semi-major axis of the reflective surface 412 or the axis 219 with respect to the x- and y-dimensions in a clockwise direction (corresponding to a shift toward the lower boundary 922) or a counterclockwise direction (corresponding to a shift toward the upper boundary 914). Such a shift in the scan region corresponds to a shift in the FOV of the laser projector of the display system.

As an example, a scene 924 is visible via a display system (e.g., an embodiment of the display system 100 of FIG. 1) that includes the laser projector (e.g., an embodiment of the laser projector 200 of FIG. 2) that includes the optical scanner 901. In some embodiments, the scene 924 corresponds to a FOV of a user of the display system. Image(s) carried by the laser light 218 (while the optical switch 902 is in the depicted orientation) are projected onto a FOV in an upper region 926 (e.g., an embodiment of the FOV area 106 of FIG. 1) of the scene 924. The scene 924 of the present example is an augmented reality scene that includes virtual content generated by the display system and projected (scanned via the optical scanner 901) over the FOV in the upper region 926. In the present example, the virtual content displayed in the upper region 926 overlays a view of a physical scene corresponding to a physical environment around the display system. A shift in the scan region of the optical scanner 901 toward the upper boundary 914 (as illustrated by the offset scan region 912 of the present example) causes the FOV to be shifted to an upper region 926 of the scene of the display system, such as the upper region 926. A shift in the scan region toward the lower boundary 922 causes the FOV to be shifted to a lower region of the scene of the display system.

For example, the power consumption of a non-optical-switch-based display system is higher than that of an embodiment of an optical-switch-based display system that includes the optical scanner 901, given a scenario in which, for each display system being compared, the display angle of the total achievable FOV is about 20 degrees and an image is to be projected in a FOV with only 10 degree display angle in a region in an upper half of the display area (e.g., a display area corresponding to a total achievable FOV with a 20 degree display angle) of each display system. The scan mirror of the non-optical-switch-based display system would be required to oscillate between +5 degrees from its center position (e.g., 5 degrees counterclockwise about its axis of rotation) and −5 degrees from the center position (e.g., 5 degrees clockwise about its axis of rotation), where the "scan angle" is 5 degrees. It should be noted that the angle of reflection of light off of the scan mirror in the present example is approximately double the angle of the scan mirror itself (relative to the center position of the scan mirror), such that the range of angles over which the scan mirror oscillates (here, 10 degrees from −5 degrees to +5 degrees) is half that of the display angle of the FOV. When projecting the image in the FOV with a 10 degree display angle in the upper region of the display area, the optical engine of the display system provides no light during about half of the oscillation period of the scan mirror corresponding to the lower region of the display in which no portion of the image is being displayed (e.g., while the scan mirror is between 0 and −5 degrees, or when the scan mirror is between 0 and +5 degrees, depending on whether the image is inverted). The power consumption of the scan mirror is approximately proportional to the square of the scan mirror, so in the case of a 5 degree scan angle, the power consumption factor (defined relative to the scan angle here for the purpose of comparison), is about 25. In contrast, for some embodiments of the optical-switch-based display system that includes the optical scanner 901, the optical switch 902 changes the location of the FOV by changing the angle of incidence of the laser light 218 on the first scan mirror 206, while the scan angle of the scan mirror 206 is the minimum needed to achieve the desired display angle of the FOV. For example, in some such embodiments, the scan angle of the first scan mirror is set to 2.5 degrees (oscillating between +2.5 degrees and −2.5 degrees, compared to the center position of the first scan mirror 206), to achieve a FOV with a 10 degree display angle, and the optical switch 902 is configured to shift the FOV into an upper region (e.g., the upper region 926) of the display area. The power consumption factor is about $2.5^2=6.25$, since the scan angle of the first scan mirror 206 is about 2.5 degrees in the present example. Thus, in the present example, about 4 times less power is consumed by the optical-switch based display system that includes the optical scanner 901 than by the display system that does not use an optical switch to modify the angle of incidence of the incoming light on the scan mirror.

Figure 10:
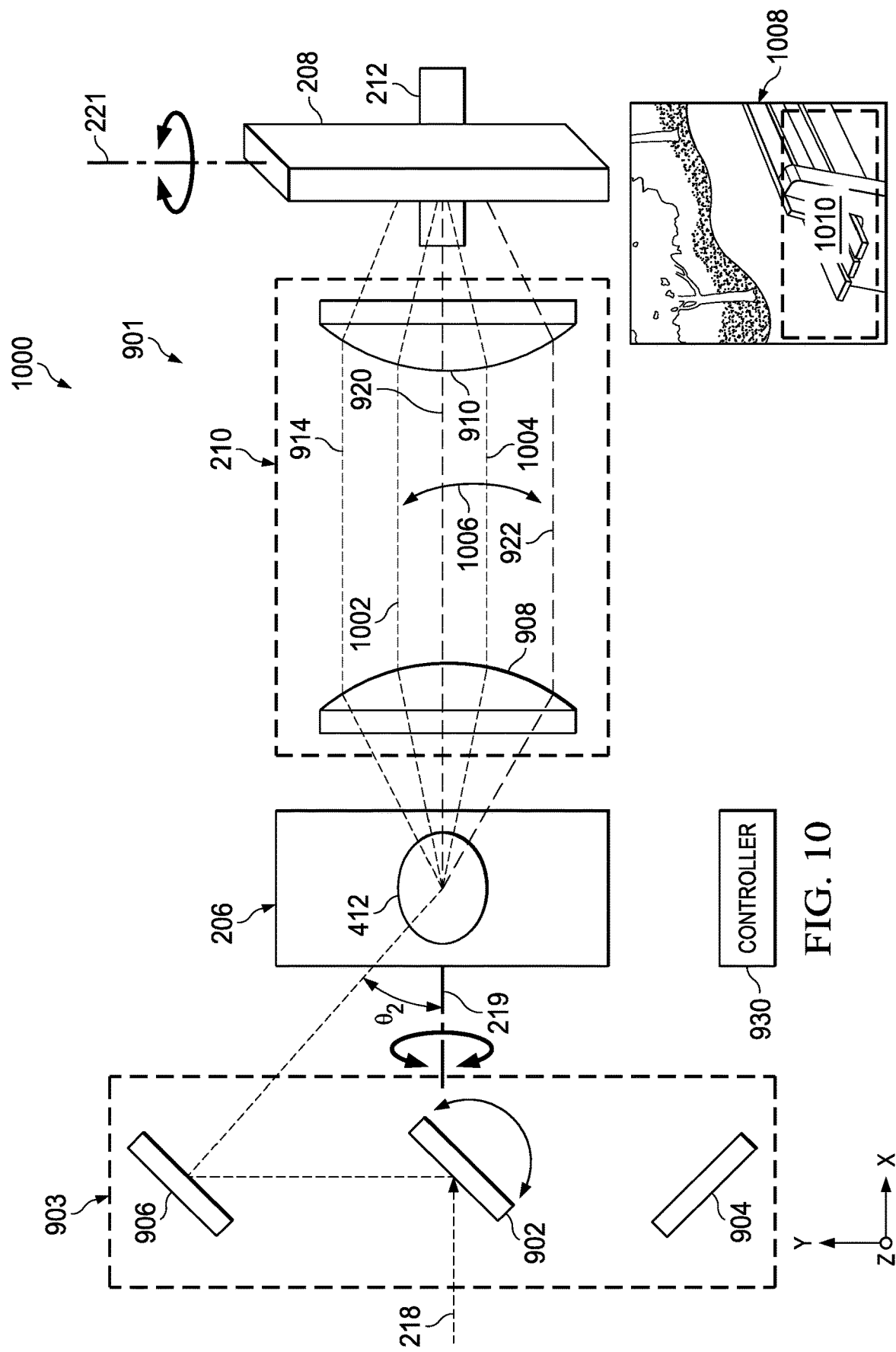
FIG. 10 is a diagram illustrating an isometric view of a portion of the laser projector of FIG. 9 in which the optical switch is oriented in a second position that causes a corresponding image to be projected to a FOV in a lower region of the display, in accordance with some embodiments.

FIG. 10 shows an illustrative isometric view 1000 of the optical scanner 901 of FIG. 9 in which an optical switch 902 is disposed in the optical path of the laser light 218 in a second orientation, such that the optical switch 902 selectively redirects the laser light 218 toward the second reflector 906. For example, the controller 930 rotates the optical switch 902 from the first orientation shown in the example of FIG. 9 to the second orientation of the present example. In the present example, the isometric view 1000 of the optical scanner 901 is provided with respect to a three-dimensional cartesian coordinate system having respectively orthogonal x-, y-, and z-axes, where the isometric view 1000 provides the perspective of looking down the positive z-axis. It should be noted that, aside from the repositioning of the optical switch 902, most structural elements of the optical scanner 901 are essentially unchanged compared to the example of FIG. 9, and some details related to such elements are not repeated here for the sake of brevity.

The laser light 218, upon being reflected by the second reflector 906, is incident upon the reflective surface 412 of the scan mirror 206 at a first angle $\theta_2$, which causes the scan mirror 206 to scan the laser light 218 into the optical relay 210 over an offset scan region 1006 that is offset with respect to a centered scan region. For example, the second angle $\theta_2$ is neither parallel nor perpendicular to the semi-major axis of the ellipse of the reflective surface 412, with respect to the x- and y-dimensions. For example, the second angle $\theta_2$ is neither parallel nor perpendicular to the axis 219, with respect to the x- and y-dimensions.

The offset scan region 1006, in contrast to the centered scan region, extends from the lower boundary 922 to an offset upper boundary 1002 that is located between the centered upper boundary 914 and a central ray 920 of the centered scan region. A central ray 1004 of the offset scan region 1006 is disposed between the lower boundary 922 and the offset upper boundary 1002. As shown, the locations of the central ray and one or both of the upper and lower boundaries of the scan region change as the angle at which the laser light 218 is incident upon the reflective surface 412 changes. The laser light 218 is reflected by the reflective surface 412 of the first scan mirror 206 through the optical relay 210 and onto the reflective surface of the second scan mirror 208, which then scans the laser light 218 across the incoupler 212.

By using the optical switch 902 and the second reflector 906 to direct the laser light 218 onto the reflective surface 412 at the second angle $\theta_2$, the scan region of the optical scanner 901 is shifted, with the amount of the shift corresponding to the magnitude of angular separation between the angle $\theta_2$ and either the semi-major axis of the reflective surface 412 or the axis 219 with respect to the x- and y-dimensions (the magnitude is the same using either axis as a reference point in the present example). Additionally, the direction of the shift (toward the upper boundary 914 or the lower boundary 922) of the scan region corresponds to whether the angle $\theta_2$ is angularly separated from the semi-major axis of the reflective surface 412 or the axis 219 with respect to the x- and y-dimensions in a clockwise direction (corresponding to a shift toward the lower boundary 922) or a counterclockwise direction (corresponding to a shift toward the upper boundary 914). Such a shift in the scan region corresponds to a shift in the FOV of the laser projector of the display system.

As an example, a scene 1008 is visible via a display system (e.g., an embodiment of the display system 100 of FIG. 1) that includes the laser projector (e.g., an embodiment of the laser projector 200 of FIG. 2) that includes the optical scanner 901. In some embodiments, the scene 1008 corresponds to a FOV of a user of the display system. Image(s) carried by the laser light 218 (while the optical switch 902 is in the depicted orientation) are projected onto a FOV in a lower region 1010 (e.g., an embodiment of the FOV area 106 of FIG. 1) of the scene 1008. The scene 1008 of the present example is an augmented reality scene that includes virtual content generated by the display system and projected (scanned via the optical scanner 901) over the FOV in the lower region 1010. In the present example, the virtual content displayed in the lower region 1010 overlays a view of a physical scene corresponding to a physical environment around the display system. A shift in the scan region of the optical scanner 901 toward the upper boundary 914 (as illustrated by the offset scan region 912 of the present example) causes the FOV to be shifted to an upper region of the scene of the display system. A shift in the scan region toward the lower boundary 922 (as illustrated by the offset scan region 1006 of the present example) causes the FOV to be shifted to a lower region of the scene of the display system, such as the lower region 1010.

While the examples of FIGS. 9 and 10 show two positions of the optical switch 902, it should be understood that, according to various embodiments, the optical switch 902 is rotatable between multiple positions, such that the position of the offset scan region (e.g., the offset scan region 912 or the offset scan region 1006) is adjustable at a finer level of granularity. In some embodiments, the optical switch 902 is additionally rotatable about more than a single axis. In some such embodiments, the optical switch 902 is capable of rotation about each of two axes, allowing for the scan region of the optical scanner 901 and the FOV of the laser projector to be shifted in more than two directions (e.g., left and right, in addition to up and down). For embodiments in which the optical switch 902 is rotatable about two or more axes, additional stationary reflectors are included around the optical switch 902 in addition to the first reflector 904 and the second reflector 906.

In some embodiments, an optical scanner includes multiple optical switches configured to selectively direct incoming light onto a first scan mirror, thereby selectively shifting the position of a scan region of the optical scanner and an associated FOV. FIGS. 11-14 shows respective views of different states of a portion of an optical scanner 1102 having an optical switch assembly 1103 (one embodiment of the optical switch assembly 203 of FIG. 2) that includes a first optical switch 1104 and a second optical switch 1106, each of which is selectively rotatable by a controller 1120. The views shown in the examples of FIGS. 11-14 of the optical scanner 1102 is provided with respect to a three-dimensional cartesian coordinate system having respectively orthogonal x-, y-, and z-axes, and each view provides the perspective of looking down the positive z-axis.

Figure 11:
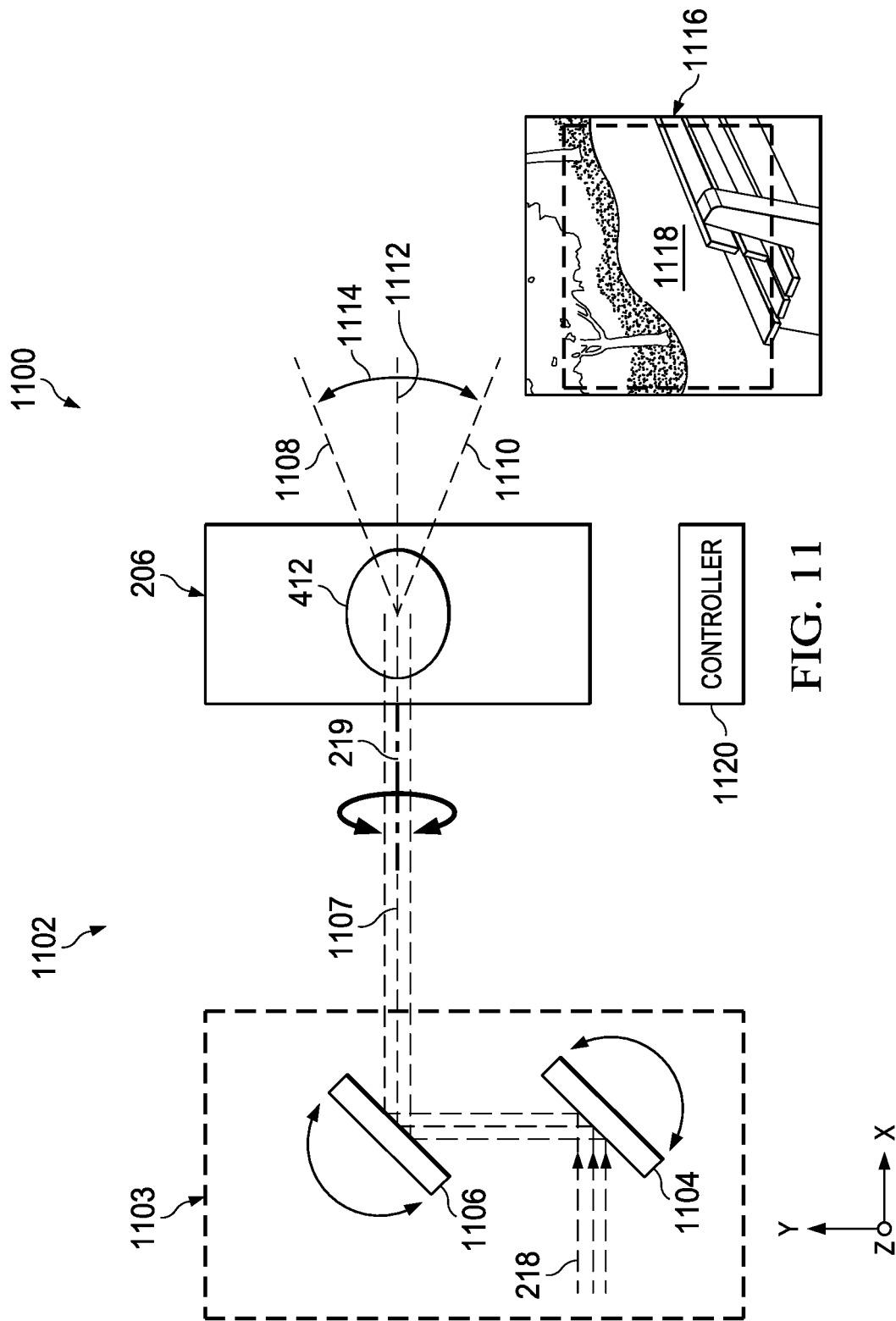
FIG. 11 is a diagram illustrating an isometric view of a portion of a laser projector in which two optical switches are positioned to direct incoming laser light onto a scan mirror at a first angle to project a corresponding image to a FOV in a center region of the display, in accordance with some embodiments.

FIG. 11 shows an isometric view 1100 of an embodiment of the optical scanner 1102 (one embodiment of the optical scanner 204 of the laser projector 200 of FIG. 2) in which the first optical switch 1104 and the second optical switch 1106 of the optical switch assembly 1103 are respectively oriented to direct laser light 218 onto the reflective surface 412 of the first scan mirror 206 at an angle that is substantially perpendicular to a semi-minor axis of the ellipse of the reflective surface 412 with respect to the x- and y-dimensions, substantially parallel to a semi-major axis of the ellipse of the reflective surface 412 with respect to the x- and y-dimensions and, similarly, substantially parallel to the axis 219 about which the reflective surface 412 oscillates with respect the x- and y-dimensions. While some embodiments of the optical scanner 1102 include an optical relay, such as the optical relay 210, and a second scan mirror, such as the second scan mirror 208, such elements are not illustrated in the present example. Examples of arrangements of such elements are, for example, shown in FIGS. 9 and 10, and such arrangements are applicable to the optical scanner 1102 of the present example.

A first reflective surface of the first optical switch 1104 reflects laser light 218 toward a second reflective surface of the second optical switch 1106. In some embodiments, a central ray 1107 of the laser light 218 is incident on the reflective surface 412 at or near a central point of the reflective surface 412. The second optical switch 1106 reflects the laser light 218 toward the reflective surface 412 of the first scan mirror 206. The reflective surface 412 oscillates about the axis 219 to scan the laser light 218 over a scan region 1114 (a centered scan region, in the present example) and toward an incoupler, such as the incoupler 212, via intervening optical elements, such as some embodiments of the optical relay 210 and the second scan mirror 208, for example. The scan region 1114 is defined by an upper boundary 1108, a lower boundary 1110, and a central ray 1112 disposed between the upper boundary 1108 and the lower boundary 1110 (such that the central ray 1112 bisects the scan region 1114 into two substantially equal sections, for example).

Because the scan region 1114 is "centered" in the present example, the region of a corresponding FOV is also offset. For example, a scene 1116 is visible via a display system (e.g., an embodiment of the display system 100 of FIG. 1) that includes a laser projector (e.g., an embodiment of the laser projector 200 of FIG. 2) that includes the optical scanner 1102. In some embodiments, the scene 1116 corresponds to a FOV of a user of the display system. The region of the FOV of the display system is also centered in the scene 1116, in some embodiments. For example, images carried by the laser light 218 (while the optical switches 1104 and 1106 are in the depicted orientation) are projected onto a FOV in a central region 1118 (e.g., an embodiment of the FOV area 106 of FIG. 1) of the scene 1116. The scene 1116 of the present example is an augmented reality scene that includes virtual content generated by the display system and projected (scanned via the optical scanner 1102) over the FOV in the central region 1118. In the present example, the virtual content displayed in the central region 1118 overlays a view of a physical scene corresponding to a physical environment around the display system. When the controller 1120 causes the first optical switch 1104 and the second optical switch 1106 to rotate, thereby changing their respective orientations from those shown, this shifts the angle at which the laser light 218 is incident on the reflective surface 412, thereby shifting the region of the FOV.

Figure 12:
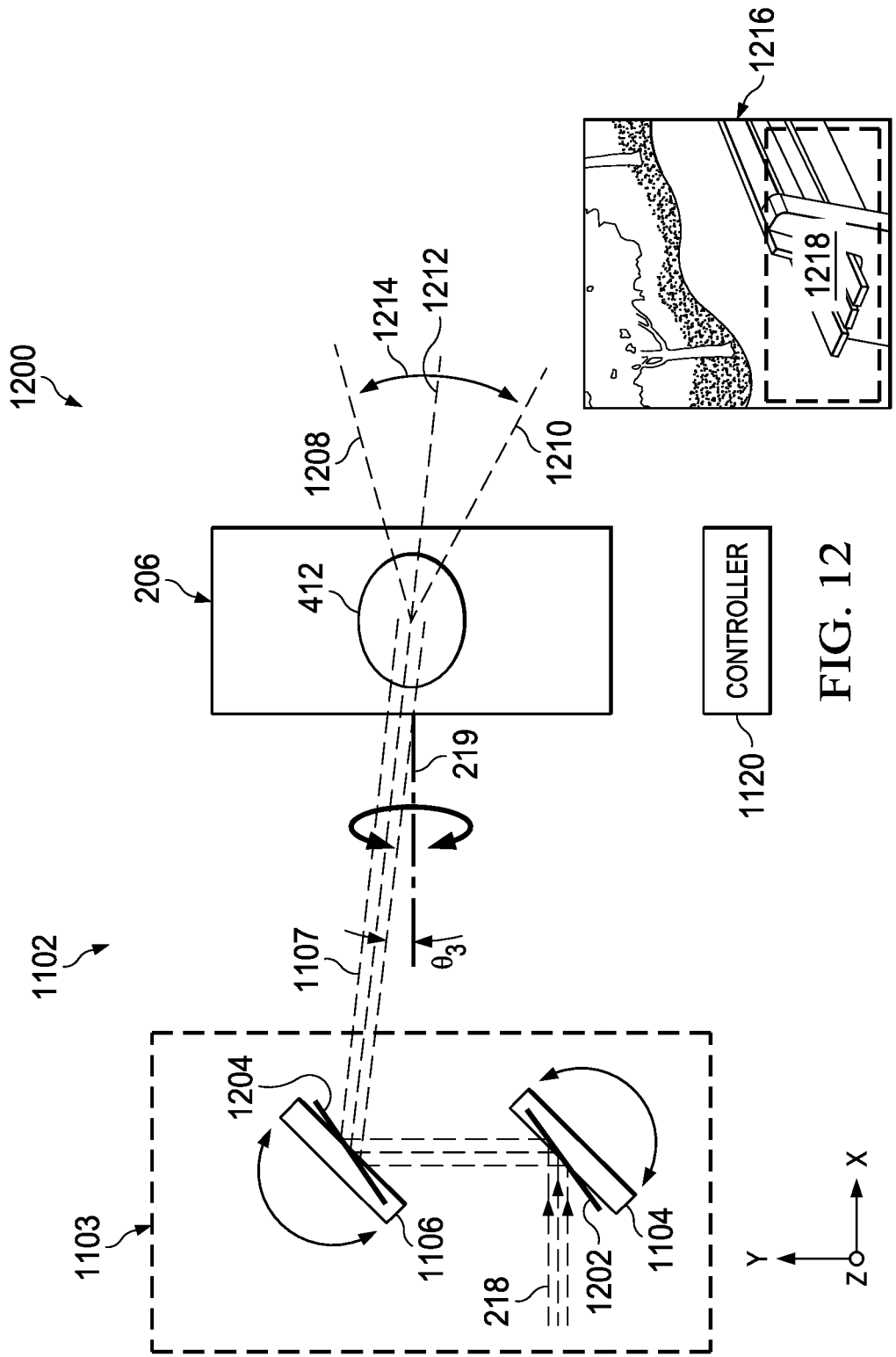
FIG. 12 is a diagram illustrating an isometric view of a portion of the laser projector of FIG. 11 in which the two optical switches are positioned to direct incoming laser light onto the scan mirror at a second angle to project a corresponding image to a FOV in a lower region of the display, in accordance with some embodiments.

FIG. 12 shows an isometric view 1200 of an embodiment of the optical scanner 1102 in which the controller 1120 selectively modifies the orientation of the first optical switch 1104 and the orientation of the second optical switch 1106 to direct laser light 218 onto the reflective surface 412 of the first scan mirror 206 at an angle $\theta_3$ that is non-perpendicular and non-parallel to both a semi-major axis of the ellipse of the reflective surface 412 with respect to the x- and y-dimensions and the axis 219 about which the reflective surface 412 oscillates with respect the x- and y-dimensions. In the present example, controller 1120 modifies the orientations of the first optical switch 1104 and the second optical switch 1106 by causing a first reflective surface 1202 of the first optical switch 1104 causing a second reflective surface 1204 of the second optical switch 1106 to rotate. In some other embodiments, the controller 1120 rotates additional portions of the first optical switch 1104 and the second optical switch 1106, instead of only rotating the first reflective surface 1202 and the second reflective surface 1204. In some embodiments, the controller 1120 is configured to rotate the first reflective surface 1202 and the second reflective surface 1204 by the same amount in the same direction (clockwise or counterclockwise about their respective axes of rotation), such that the first reflective surface 1202 and the second reflective surface 1204 lie in (e.g., are aligned within) respective and substantially parallel planes. In this way, the controller 1120 effectively modifies the angle of incidence of the laser light 218 on the reflective surface 412 without significantly changing the position at which the laser light 218 is incident on the reflective surface 412.

The first reflective surface 1202 of the first optical switch 1104 reflects the laser light 218 toward the second reflective surface 1204 of the second optical switch 1106. In some embodiments, a central ray 1107 of the laser light 218 is incident on the reflective surface 412 at or near a central point of the reflective surface 412. The second reflective surface 1204 of the second optical switch 1106 reflects the laser light 218 toward the reflective surface 412 of the first scan mirror 206. The reflective surface 412 oscillates about the axis 219 to scan the laser light 218 over a scan region 1214 (an offset scan region, in the present example) and toward an incoupler, such as the incoupler 212, via intervening optical elements, such as some embodiments of the optical relay 210 and the second scan mirror 208, for example. The scan region 1214 is defined by an upper boundary 1208, a lower boundary 1210, and a central ray 1212 disposed between the upper boundary 1208 and the lower boundary 1210 (such that the central ray 1212 bisects the scan region 1214 into two substantially equal sections, for example).

Because the scan region 1214 is "offset" (in the negative y-direction) in the present example, the region of a corresponding FOV is also offset. For example, a scene 1216 is visible via a display system (e.g., an embodiment of the display system 100 of FIG. 1) that includes laser projector (e.g., an embodiment of the laser projector 200 of FIG. 2) that includes the optical scanner 1102. In some embodiments, the scene 1216 corresponds to a FOV of a user of the display system. The region of the FOV of the display system is offset toward a lower portion of the scene 1216, in some embodiments. For example, images carried by the laser light 218 (while the optical switches 1104 and 1106 are in the depicted orientation) are projected onto a FOV (e.g., an embodiment of the FOV area 106 of FIG. 1) in a lower region 1218 of the scene 1216. The scene 1216 of the present example is an augmented reality scene that includes virtual content generated by the display system and projected (scanned via the optical scanner 1102) over the FOV in the lower region 1218. In the present example, the virtual content displayed in the lower region 1218 overlays a view of a physical scene corresponding to a physical environment around the display system. When the controller 1120 causes the first optical switch 1104 and the second optical switch 1106 to rotate, thereby changing their respective orientations from those shown, this shifts the angle at which the laser light 218 is incident on the reflective surface 412, thereby shifting the region of the FOV.

Figure 13:
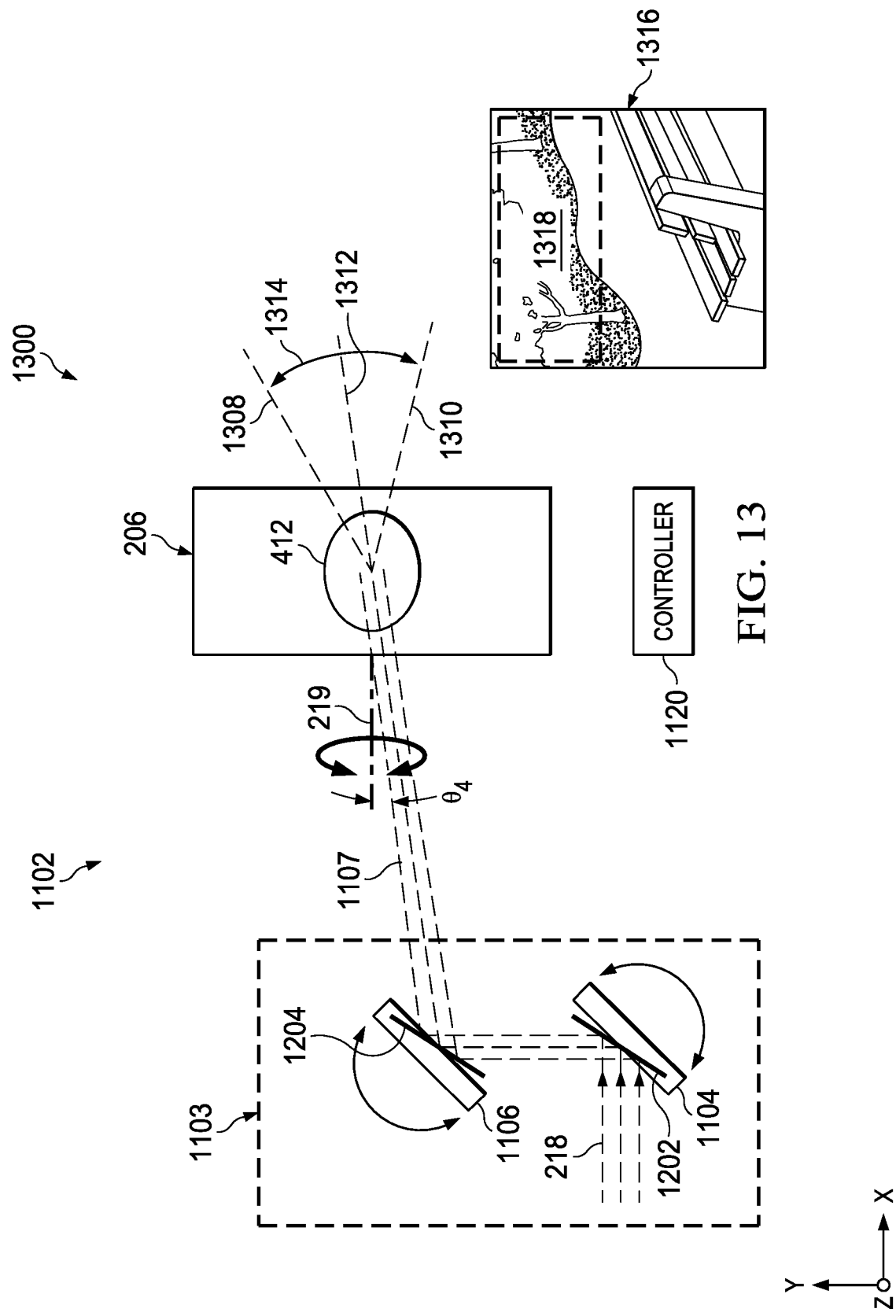
FIG. 13 is a diagram illustrating an isometric view of a portion of the laser projector of FIG. 11 in which the two optical switches are positioned to direct incoming laser light onto the scan mirror at a third angle to project a corresponding image to a FOV in an upper region of the display, in accordance with some embodiments.

FIG. 13 shows an isometric view 1300 of an embodiment of the optical scanner 1102 in which the controller 1120 selectively modifies the orientation of the first optical switch 1104 and the orientation of the second optical switch 1106 to direct laser light 218 onto the reflective surface 412 of the first scan mirror 206 at an angle $\theta_4$ that is non-perpendicular and non-parallel to both a semi-major axis of the ellipse of the reflective surface 412 with respect to the x- and y-dimensions and the axis 219 about which the reflective surface 412 oscillates with respect the x- and y-dimensions. In the present example, controller 1120 modifies the orientations of the first optical switch 1104 and the second optical switch 1106 by causing the first reflective surface 1202 of the first optical switch 1104 causing the second reflective surface 1204 of the second optical switch 1106 to rotate. In some other embodiments, the controller 1120 rotates additional portions of the first optical switch 1104 and the second optical switch 1106, instead of only rotating the first reflective surface 1202 and the second reflective surface 1204. In some embodiments, the controller 1120 is configured to rotate the first reflective surface 1202 and the second reflective surface 1204 by the same amount in the same direction (clockwise or counterclockwise about their respective axes of rotation), such that the first reflective surface 1202 and the second reflective surface 1204 lie in (e.g., are aligned within) respective and substantially parallel planes. In this way, the controller 1120 effectively modifies the angle of incidence of the laser light 218 on the reflective surface 412 without significantly changing the position at which the laser light 218 is incident on the reflective surface 412.

The first reflective surface 1202 of the first optical switch 1104 reflects the laser light 218 toward the second reflective surface 1204 of the second optical switch 1106. In some embodiments, a central ray 1107 of the laser light 218 is incident on the reflective surface 412 at or near a central point of the reflective surface 412. The second reflective surface 1204 of the second optical switch 1106 reflects the laser light 218 toward the reflective surface 412 of the first scan mirror 206. The reflective surface 412 oscillates about the axis 219 to scan the laser light 218 over a scan region 1314 (an offset scan region, in the present example) and toward an incoupler, such as the incoupler 212, via intervening optical elements, such as some embodiments of the optical relay 210 and the second scan mirror 208, for example. The scan region 1314 is defined by an upper boundary 1308, a lower boundary 1310, and a central ray 1312 disposed between the upper boundary 1308 and the lower boundary 1310 (such that the central ray 1312 bisects the scan region 1314 into two substantially equal sections, for example). In some embodiments, the controller 1120 is configured to shift the scan region 1314 and the region of the FOV in this way responsive to determining that an image is to be projected (e.g., only projected) within the boundary of the upper region 1318. By selectively shifting the region of the FOV of the display in this way, power and time efficiencies of the display are improved, since the optical scanner 1102 only scans the laser light 218 over a subset (e.g., the upper region 1318) of the entire visible area of the display, rather than scanning the laser light 218 over the entire visible area.

Because the scan region 1314 is "offset" (in the positive y-direction) in the present example, the region of a corresponding FOV is also offset. For example, a scene 1316 is visible via a display system (e.g., an embodiment of the display system 100 of FIG. 1) that includes laser projector (e.g., an embodiment of the laser projector 200 of FIG. 2) that includes the optical scanner 1102. In some embodiments, the scene 1316 corresponds to a FOV a user of the display system. The region of the FOV of the display system is offset toward a lower portion of the scene 1316, in some embodiments. For example, images carried by the laser light 218 (while the optical switches 1104 and 1106 are in the depicted orientation) are projected onto a FOV (e.g., an embodiment of the FOV area 106 of FIG. 1) in an upper region 1318 of the scene 1316. The scene 1316 of the present example is an augmented reality scene that includes virtual content generated by the display system and projected (scanned via the optical scanner 1102) over the FOV in the upper region 1318. In the present example, the virtual content displayed in the upper region 1318 overlays a view of a physical scene corresponding to a physical environment around the display system. When the controller 1120 causes the first optical switch 1104 and the second optical switch 1106 to rotate, thereby changing their respective orientations from those shown, this shifts the angle at which the laser light 218 is incident on the reflective surface 412, thereby shifting the region of the FOV. In some embodiments, the controller 1120 is configured to shift the scan region 1314 and the region of the FOV in this way responsive to determining that an image is to be projected (e.g., only projected) within the boundary of the upper region 1318.

Figure 14:
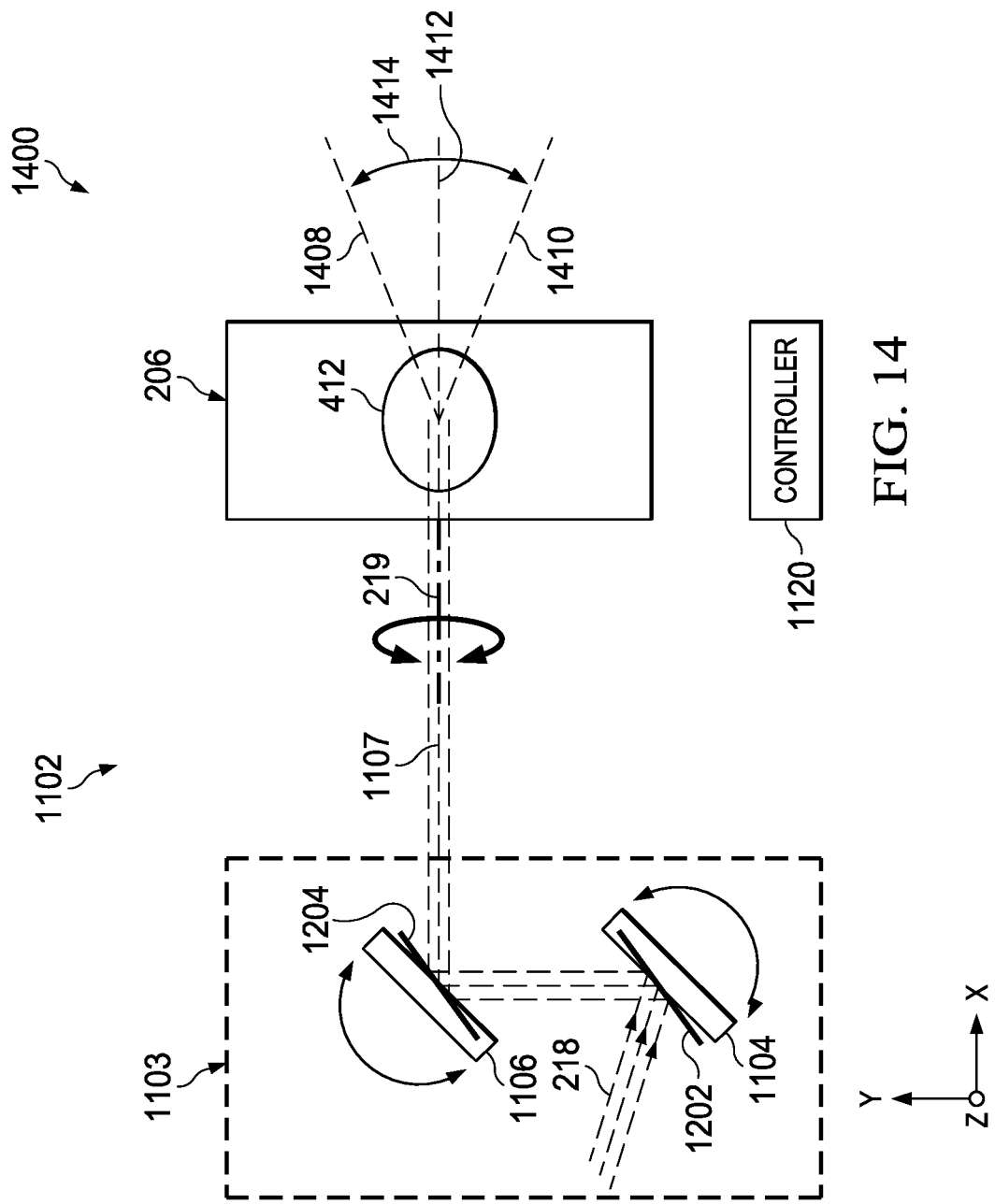
FIG. 14 is a diagram illustrating an isometric view of a portion of the laser projector of FIG. 11 in which the two optical switches are positioned to correct a non-ideal angle of incoming laser light, in accordance with some embodiments.

FIG. 14 shows an isometric view 1400 of an embodiment of the optical scanner 1102 in which the controller 1120 selectively modifies the orientation of the first optical switch 1104 and the orientation of the second optical switch 1106 to direct laser light 218 onto the reflective surface 412 of the first scan mirror 206 at an angle that is substantially perpendicular to a semi-minor axis of the ellipse of the reflective surface 412 with respect to the x- and y-dimensions, substantially parallel to a semi-major axis of the ellipse of the reflective surface 412 with respect to the x- and y-dimensions and, similarly, substantially parallel to the axis 219 about which the reflective surface 412 oscillates with respect to the x- and y-dimensions. In the present example, the laser light 218 is incident on the first reflective surface 1202 of the first optical switch 1104 at a non-ideal angle (that is, an angle that is not substantially parallel to the axis 219 and the semi-major axis of the ellipse of the reflective surface 412 of the first scan mirror 206 with respect to the x- and y-dimensions). The controller 1120 modifies the orientations of the first optical switch 1104 and the second optical switch 1106 by causing the first reflective surface 1202 of the first optical switch 1104 and the second reflective surface 1204 of the second optical switch 1106 to each rotate in order to correct the angle at which the laser light 218 is incident on the reflective surface 412, such that the angle is substantially parallel to the axis 219 and the semi-major axis of the ellipse of the reflective surface 412 of the first scan mirror 206 with respect to the x- and y-dimensions. In some other embodiments, the controller 1120 rotates additional portions of the first optical switch 1104 and the second optical switch 1106, instead of only rotating the first reflective surface 1202 and the second reflective surface 1204. In some embodiments, the controller 1120 is configured to rotate the first reflective surface 1202 and the second reflective surface 1204 by the same amount in the same direction (clockwise or counter-clockwise about their respective axes of rotation), such that the first reflective surface 1202 and the second reflective surface 1204 lie in (e.g., are aligned within) respective and substantially parallel planes. In this way, the controller 1120 effectively modifies the angle of incidence of the laser light 218 on the reflective surface 412 without significantly changing the position at which the laser light 218 is incident on the reflective surface 412.

In this way, the controller 1120 is able to dynamically mitigate non-idealities in the angle of the laser light 218 by modifying the respective orientations of the first optical switch 1104 and the second optical switch 1106 (e.g., via modification of the first and second reflective surfaces 1202 and 1204 thereof). Because such non-idealities are correctable in this way, less strict tolerances are required for the optical engine (e.g., the optical engine 202 of FIG. 2) that outputs the laser light 218. Such less restrictive tolerances for the optical engine, in turn, improve design flexibility for the optical engine.

The first reflective surface 1202 of the first optical switch 1104 reflects the laser light 218 toward the second reflective surface 1204 of the second optical switch 1106. In some embodiments, a central ray 1107 of the laser light 218 is incident on the reflective surface 412 at or near a central point of the reflective surface 412. The second reflective surface 1204 of the second optical switch 1106 reflects the laser light 218 toward the reflective surface 412 of the first scan mirror 206. The reflective surface 412 oscillates about the axis 219 to scan the laser light 218 over a scan region 1414 (a centered scan region, in the present example) and toward an incoupler, such as the incoupler 212, via intervening optical elements, such as some embodiments of the optical relay 210 and the second scan mirror 208, for example. The scan region 1414 is defined by an upper boundary 1408, a lower boundary 1410, and a central ray 1412 disposed between the upper boundary 1408 and the lower boundary 1410 (such that the central ray 1412 bisects the scan region 1414 into two substantially equal sections, for example).

As indicated above, in the present example, the controller 1120 corrects a non-ideal angle of the laser light 218, such that the laser light 218 is incident upon the reflective surface 412 of the first scan mirror 206 at an angle that is substantially parallel to the axis 219 and the semi-major axis of the ellipse of the reflective surface 412 with respect to the x- and y- dimensions. However, in some embodiments, the controller 1120 is configured to selectively shift the scan region 1414 (e.g., in the positive or negative y-directions) in addition to accounting for the non-ideal angle at which the laser light 218 approaches the first optical switch 1104 in order to selectively change the region of a FOV of the display that includes the optical scanner 1102.

Figure 15:
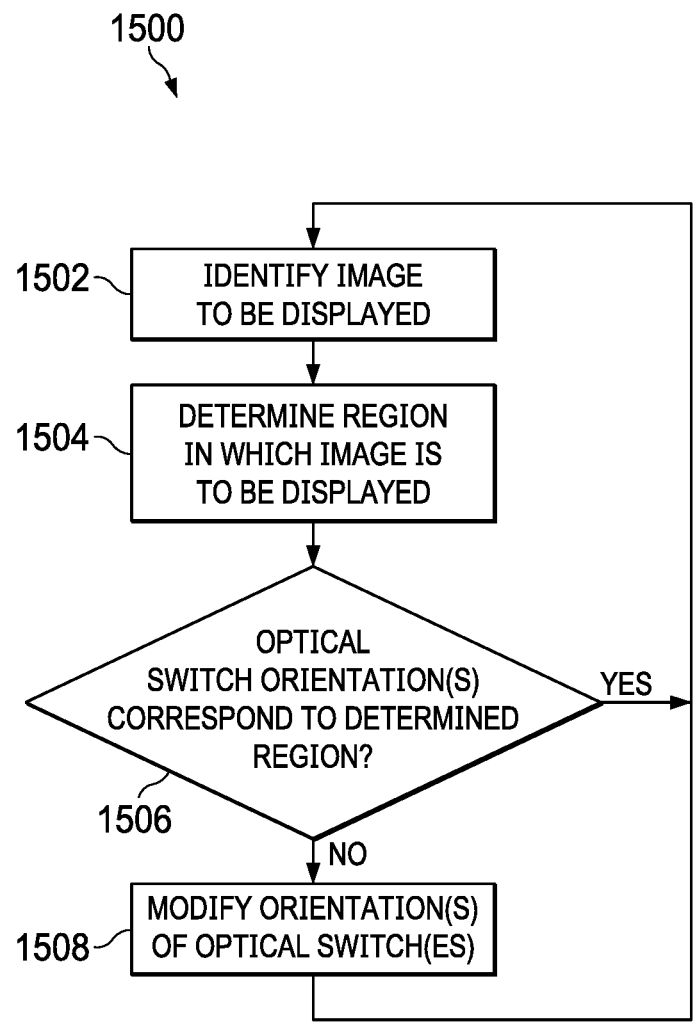
FIG. 15 is a flow chart illustrating a method for selectively repositioning at least one optical switch of a laser projector to change a region of a FOV of a display system to which the laser projector projects an image, in accordance with some embodiments.

FIG. 15 shows an illustrative method 1500 for selectively modifying orientation(s) of one or more optical switches of the optical scanner (e.g., an embodiment of the optical scanner 204 of FIGS. 2 and 9-14) of a laser projector (e.g., an embodiment of the laser projector 200 of FIG. 2) of a display system (e.g., an embodiment of the display system 100 of FIG. 1). In some embodiments, the method 1500 is performed, at least in part, by executing computer-readable instructions at a controller, such as an embodiment of the controller 930 of FIGS. 9 and 10 or an embodiment of the controller 1120 of FIGS. 11-14.

At block 1502, the controller identifies an image to be displayed via the laser projector at a FOV of the display system.

At block 1504, the controller determines a region of the visible area of the display system in which the image is to be displayed. In some instances, an image is to be displayed over most or all of the visible area of the display system, while in other instances, the image is to be displayed in a subset of the visible area (e.g., offset to one side of the visible area).

At block 1506, the controller determines whether one or more respective orientations of one or more optical switches (i.e., "optical switch orientations") of an optical switch assembly (e.g., an embodiment of the optical switch assembly 903 of FIGS. 9 and 10 or an embodiment of the optical switch assembly 1103 of FIGS. 11-14) correspond to the determined region. For example, the controller determines whether the optical switches are oriented to shift the region of the FOV to the determined region in which the image is to be projected. If the optical switch orientation(s) currently correspond to the determined region, then the controller does not modify the optical switch orientation(s), and the method 1500 returns to block 1502. Otherwise, if the optical switch orientation(s) do not currently correspond to the determined region, the method 1500 proceeds to block 1508.

At block 1508, the controller modifies the optical switch orientations to correspond to the determined region. For example, the controller modifies the optical switch orientation(s) to shift the FOV to the determined region. The method 1500 then returns to block 1502.

Various embodiments described above are provided in the context of generating and routing laser light through an optical system. However, it should be understood that, in addition to or in place of such laser light and corresponding laser light sources, other applicable collimated light sources and corresponding light may be used in conjunction with the described embodiments.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A laser projector comprising:
    a scan mirror configured to scan laser light over a scan region; and
    an optical switch having an adjustable orientation, the optical switch being configured to selectively direct laser light onto the scan mirror at an angle that is dependent on the adjustable orientation.

2. The laser projector of claim 1, further comprising:
    a controller configured to selectively modify the adjustable orientation of the optical switch to change the angle at which the laser light is directed onto the scan mirror.

3. The laser projector of claim 2, wherein the laser projector is configured to project at least one image over a field of view via the laser light, wherein the controller is configured to selectively change respective positions of the scan region and the field of view by selectively modifying the adjustable orientation of the optical switch to change the angle at which the laser light is directed onto the scan mirror.

4. The laser projector of claim 3, wherein the controller is configured to selectively modify the adjustable orientation of the optical switch to change the angle at which the laser light is directed onto the scan mirror responsive to determining that an image conveyed by the laser light is to be projected onto a first region, wherein changing the angle, with the controller, causes the field of view to be shifted to the first region.

5. The laser projector of claim 2, further comprising:
    a second optical switch having a second adjustable orientation, wherein the second optical switch is configured to direct laser light toward the optical switch, and wherein the controller is further configured to selectively modify the second adjustable orientation of the second optical switch to change the angle in conjunction with selectively modifying the adjustable orientation of the optical switch.

6. The laser projector of claim 5, wherein the controller is configured to modify the adjustable orientation of the optical switch and the second adjustable orientation of the second optical switch to cause the angle at which the laser light is directed onto the scan mirror to be substantially parallel, with respect to a first dimension and a second dimension, to an axis about which the scan mirror is configured to oscillate, wherein the first dimension is orthogonal to the second dimension.

7. The laser projector of claim 1, further comprising: an optical switch assembly comprising:
    the optical switch;
    a first reflector, wherein the optical switch, in a first orientation, is positioned to direct the laser light onto the scan mirror via the first reflector; and
    a second reflector, wherein the optical switch, in a second orientation, is positioned to direct the laser light onto the scan mirror via the second reflector.

8. A near-eye display comprising the laser projector of claim 1, and further comprising:
    an eyeglasses frame that surrounds at least a portion of the laser projector; and
    an eyeglasses lens, wherein the laser projector is configured to output the laser light through at least a portion of the eyeglasses lens.

9. A near-eye display comprising:
    a laser projector comprising:
        a first scan mirror configured to scan laser light over a scan region; and
        an optical switch assembly configured to direct laser light onto the first scan mirror; and
    a controller configured to selectively modify the optical switch assembly to change an angle at which the laser light is incident upon the first scan mirror.

10. The near-eye display of claim 9, wherein the optical switch assembly comprises:
    an optical switch positioned to redirect the laser light, wherein the controller is
    configured to modify the optical switch assembly by modifying an orientation of the optical switch;
    a first reflector positioned to redirect the laser light toward the first scan mirror at a first angle when the orientation of the optical switch is a first orientation; and
    a second reflector positioned to redirect the laser light toward the first scan mirror at a second angle when the orientation of the optical switch is a second orientation.

11. The near-eye display of claim 9, wherein the optical switch assembly comprises:
    a first optical switch positioned to redirect the laser light onto the first scan mirror; and
    a second optical switch positioned to redirect light onto the first optical switch, wherein the controller is configured to modify the optical switch assembly to change the angle at which the laser light is incident upon the first scan mirror by modifying a first orientation of the first optical switch and a second orientation of the second optical switch.

12. The near-eye display of claim 11, wherein the controller is configured to modify the first orientation of the first optical switch and the second orientation of the second optical switch to cause the angle at which the laser light is incident upon the first scan mirror to be substantially parallel, with respect to a first dimension and a second dimension, to an axis about which the first scan mirror is configured to oscillate, wherein the first dimension is orthogonal to the second dimension.

13. The near-eye display of claim 9, wherein the laser projector is configured to project at least one image over a field of view of the near-eye display via the laser light, and wherein the controller is configured to selectively change respective positions of the scan region and the field of view by selectively modifying the optical switch assembly to change the angle at which the laser light is incident upon the first scan mirror.

14. The near-eye display of claim 13, wherein the controller is configured to selectively modify the optical switch assembly to change the angle at which the laser light is incident upon the first scan mirror responsive to determining that an image conveyed by the laser light is to be projected onto a first region of the near-eye display, wherein changing the angle, with the controller, causes the field of view to be shifted to the first region.

15. The near-eye display of claim 9, the laser projector further comprising:

an optical relay;

a second scan mirror, wherein the first scan mirror is configured to scan the laser light onto the second scan mirror via the optical relay; and a waveguide comprising an incoupler, wherein the second scan mirror is configured to scan the laser light across the incoupler of the waveguide.

16. A method comprising:

directing laser light onto a scan mirror at an angle that is dependent on an orientation of an optical switch; and shifting a field of view of a display by selectively modifying the orientation of the optical switch.

17. The method of claim 16, wherein shifting the field of view of the display further comprises:

selectively modifying a second orientation of a second optical switch.

18. The method of claim 16, wherein shifting the field of view of the display comprises:

shifting, responsive to determining a region in which an image is to be displayed, the field of view of the display to the region by selectively modifying the orientation of the optical switch.

19. The method of claim 16, wherein selectively modifying the orientation of the optical switch changes an angle at which the laser light is incident on the scan mirror.

20. The method of claim 19, wherein changing the angle at which the laser light is incident on the scan mirror shifts a scan region over which the scan mirror scans the laser light.

* * * * *